United States Patent
Oba et al.

(10) Patent No.: US 11,237,388 B2
(45) Date of Patent: Feb. 1, 2022

(54) PROCESSING APPARATUS, IMAGE CAPTURING APPARATUS, AND IMAGE PROCESSING METHOD

(71) Applicant: SONY CORPORATION, Tokyo (JP)

(72) Inventors: Eiji Oba, Tokyo (JP); Tsuyoshi Toukairin, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/323,159

(22) PCT Filed: Jul. 21, 2017

(86) PCT No.: PCT/JP2017/026414
§ 371 (c)(1),
(2) Date: Feb. 4, 2019

(87) PCT Pub. No.: WO2018/037790
PCT Pub. Date: Mar. 1, 2018

(65) Prior Publication Data
US 2019/0179140 A1    Jun. 13, 2019

(30) Foreign Application Priority Data

Aug. 24, 2016 (JP) .............................. JP2016-163793

(51) Int. Cl.
| | |
|---|---|
| G02B 27/00 | (2006.01) |
| H04N 5/232 | (2006.01) |
| H04N 5/225 | (2006.01) |
| H04N 5/18 | (2006.01) |
| G03B 17/08 | (2021.01) |
| H04N 5/243 | (2006.01) |
| H04N 7/18 | (2006.01) |

(52) U.S. Cl.
CPC ............ *G02B 27/0006* (2013.01); *B60R 1/00* (2013.01); *G03B 17/08* (2013.01); *H04N 5/2254* (2013.01);
(Continued)

(58) Field of Classification Search
None
See application file for complete search history.

(56) References Cited

U.S. PATENT DOCUMENTS

| | | | |
|---|---|---|---|
| 2002/0139394 A1* | 10/2002 | Bronson | G02B 27/0006 134/6 |
| 2006/0192660 A1* | 8/2006 | Watanabe | B60R 1/00 340/435 |

(Continued)

FOREIGN PATENT DOCUMENTS

| | | |
|---|---|---|
| CN | 101309815 A | 11/2008 |
| CN | 102029976 A | 4/2011 |

(Continued)

OTHER PUBLICATIONS

International Search Report and Written Opinion of PCT Application No. PCT/JP2017/026414, dated Oct. 17, 2017, 20 pages of ISRWO.

*Primary Examiner* — Mark T Monk
(74) *Attorney, Agent, or Firm* — Chip Law Group

(57) ABSTRACT

There is provided an image processing apparatus that displays the camera captured image via the spin window on the display and the condition of the travel direction even in the bad weather can be more reliably checked. The image processing apparatus includes a camera that captures an image via the spin window, an image processor that generates a display image, and a display that displays the generated image by the image processor. The image processing apparatus further includes a pulse light output unit, and the camera includes a first camera and a second camera that capture images at timings after elapse of different times from a pulse light output timing of the pulse light output unit. The respective cameras capture images of different spaces, and the image processor generates a differential image between (Continued)

the images captured by the respective cameras and displays the differential image on the display.

11 Claims, 19 Drawing Sheets

(51) Int. Cl.
  *H04N 5/265* (2006.01)
  *B60R 1/00* (2006.01)
(52) U.S. Cl.
  CPC ......... *H04N 5/2256* (2013.01); *H04N 5/2257* (2013.01); *H04N 5/232121* (2018.08); *H04N 5/243* (2013.01); *H04N 5/265* (2013.01); *H04N 7/18* (2013.01); *B60R 2300/202* (2013.01); *B60R 2300/8093* (2013.01)

(56) References Cited

U.S. PATENT DOCUMENTS

| | | | |
|---|---|---|---|
| 2008/0116093 A1* | 5/2008 | Felten | A61B 1/00039 206/316.2 |
| 2009/0189974 A1* | 7/2009 | Deering | G02B 27/017 348/46 |
| 2011/0073142 A1 | 3/2011 | Hattori et al. | |
| 2012/0117745 A1 | 5/2012 | Hattori et al. | |

FOREIGN PATENT DOCUMENTS

| | | |
|---|---|---|
| CN | 103448684 A | 12/2013 |
| CN | 103448685 A | 12/2013 |
| DE | 102005055087 A1 | 5/2007 |
| DE | 502006008575 D1 | 2/2011 |
| DE | 102010041475 A1 | 6/2011 |
| EP | 1951549 A1 | 8/2008 |
| JP | 2008-213744 A | 9/2008 |
| JP | 4718614 B2 | 7/2011 |
| JP | 2011-240910 A | 12/2011 |
| JP | 2011-240915 A | 12/2011 |
| JP | 2011-240920 A | 12/2011 |
| JP | 2011-244417 A | 12/2011 |
| JP | 2009-516278 A | 4/2014 |
| JP | 2015-093587 A | 5/2015 |
| RU | 2010139894 A | 4/2012 |
| SE | 1051002 A1 | 3/2011 |
| WO | 2007/057274 A1 | 5/2007 |

\* cited by examiner

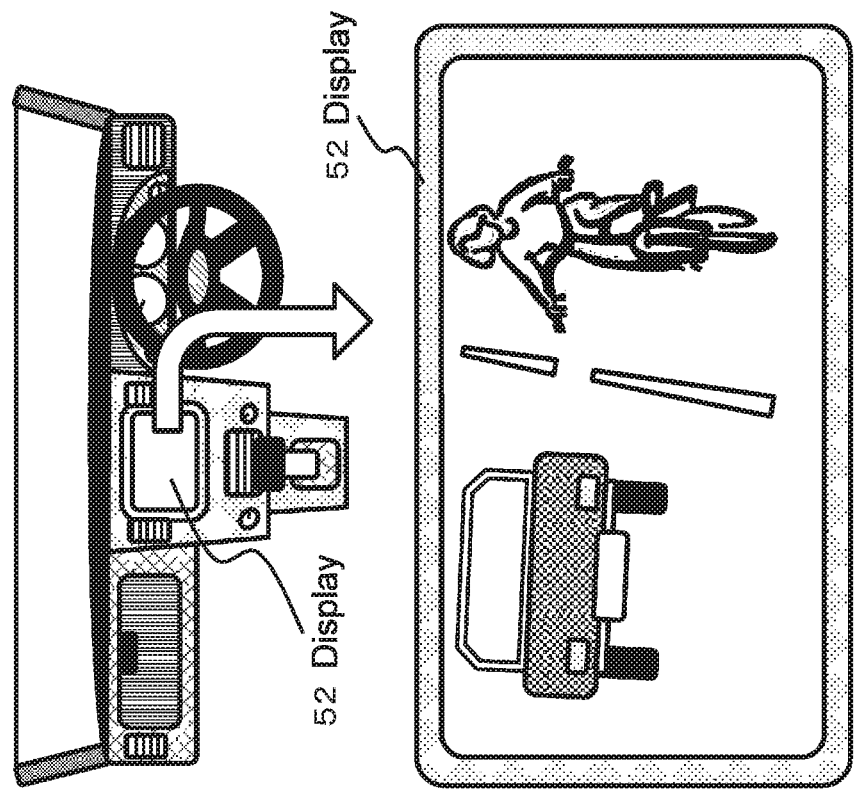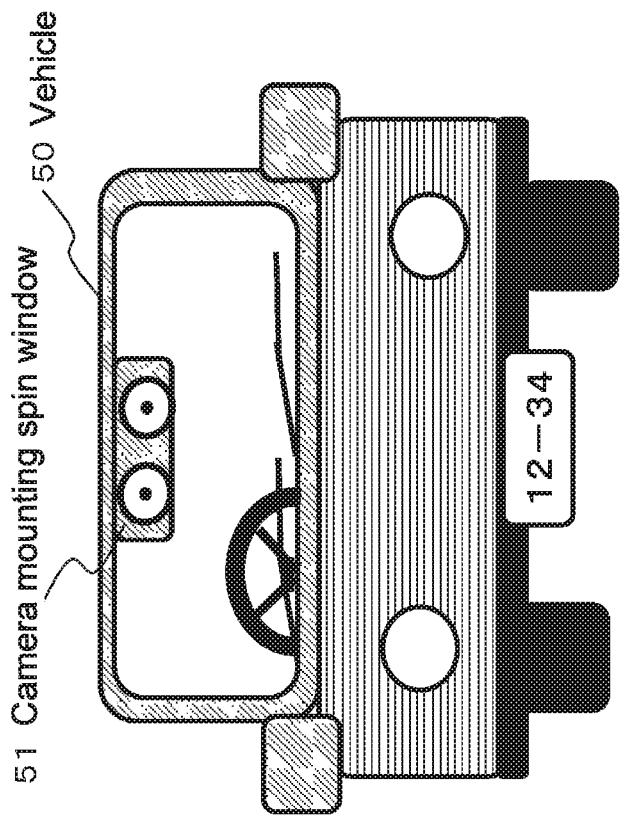

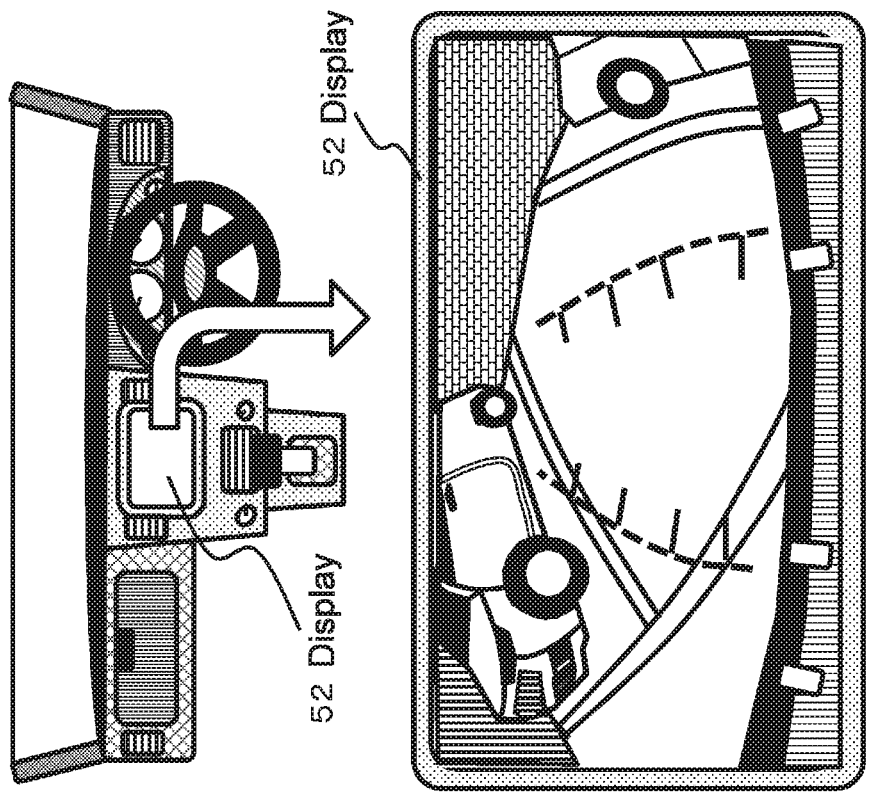
FIG. 5B Vehicle interior view
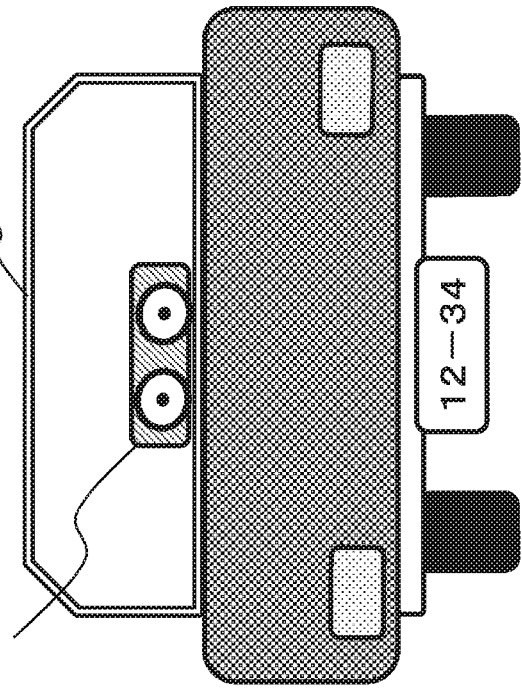
FIG. 5A Vehicle rear appearance view FIG. 13A In a case where obstacle is present in captured space FIG. 13B In a case where obstacle is not present in captured space

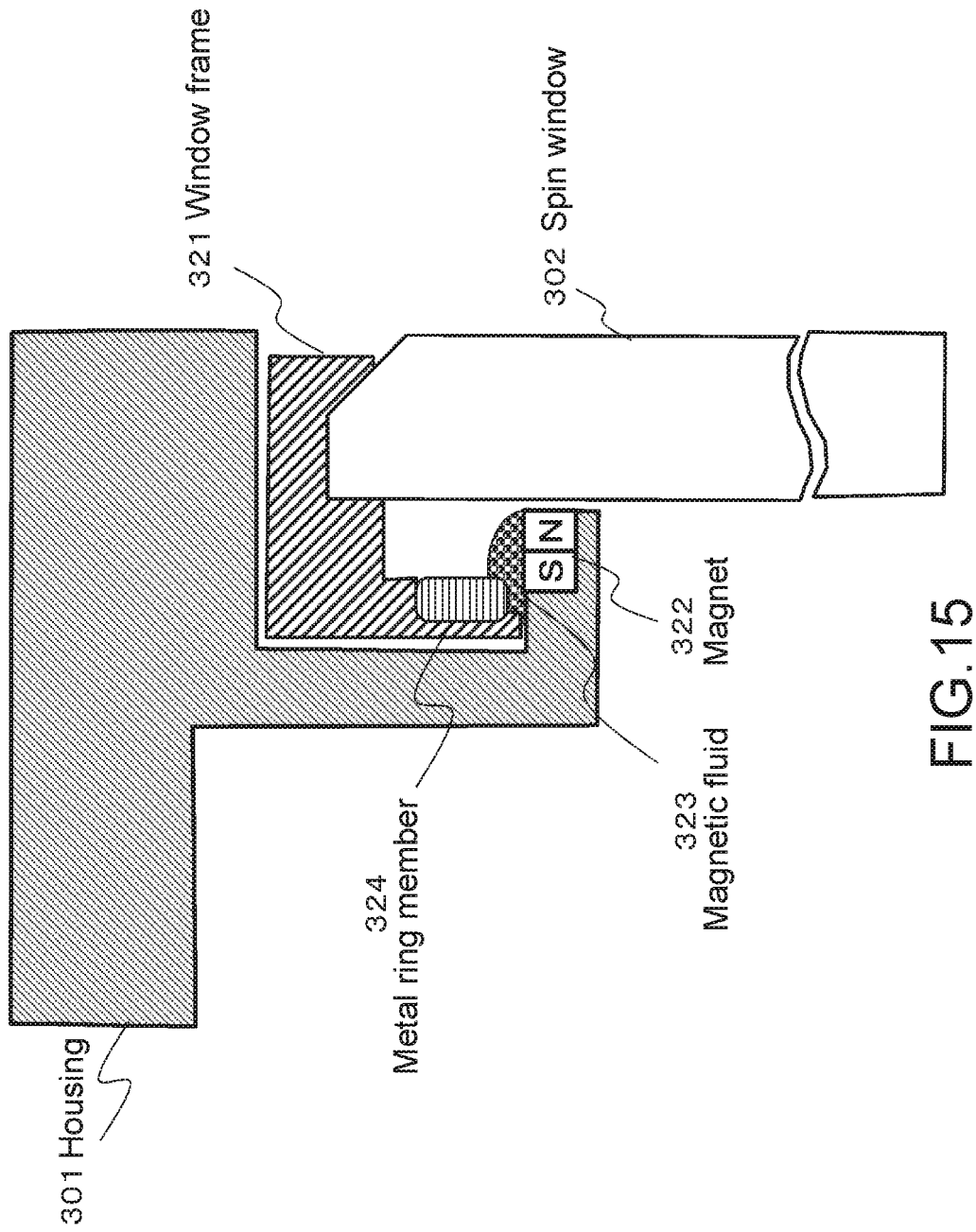

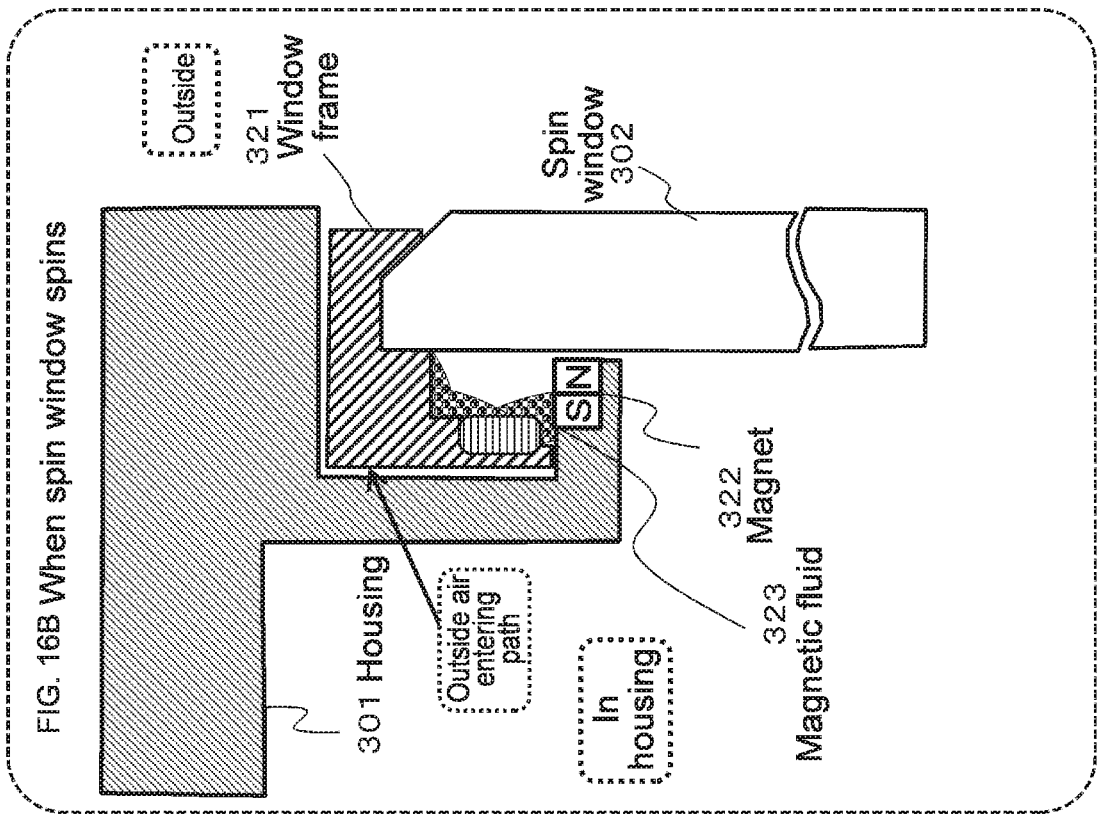
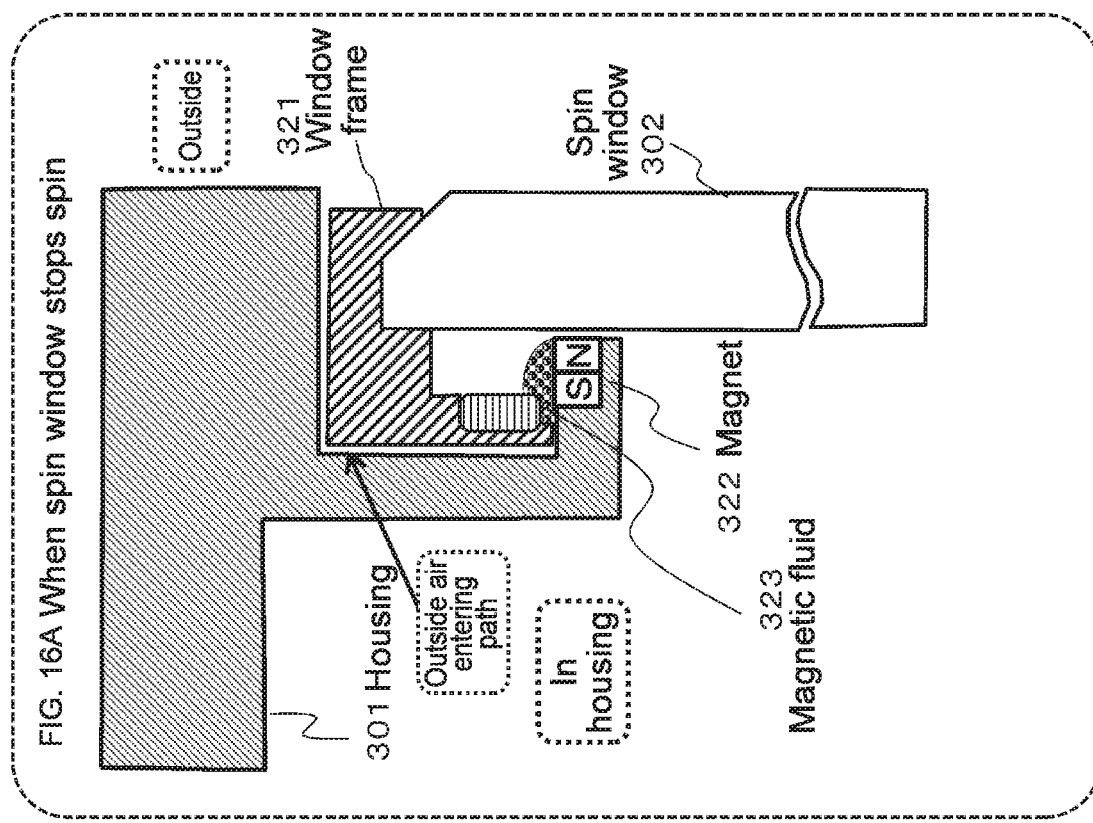

PROCESSING APPARATUS, IMAGE CAPTURING APPARATUS, AND IMAGE PROCESSING METHOD

CROSS REFERENCE TO RELATED APPLICATIONS

This application is a U.S. National Phase of International Patent Application No. PCT/JP2017/026414 filed on Jul. 21, 2017, which claims priority benefit of Japanese Patent Application No. JP 2016-163793 filed in the Japan Patent Office on Aug. 24, 2016. Each of the above-referenced applications is hereby incorporated herein by reference in its entirety.

TECHNICAL FIELD

The present disclosure relates to an image processing apparatus, an image capturing apparatus, an image processing method, and a program. More specifically, the present disclosure relates to an image processing apparatus, an image capturing apparatus, an image processing method, and a program such that an operator (driver) can check ambient conditions by capturing an image via a spin window and displaying the captured image on a display located at an operator's seat of, for example, a vehicle, a ship, or the like.

BACKGROUND ART

An operator who operates various transportation such as a train, a ship, and a vehicle needs to check conditions in a travel direction, e.g., whether or not the obstacle is present, via a front window of an operator's seat.

However, when the outside is observed via the window, for example, under a bad weather condition such as rain and snow, sufficient visibility may not be provided due to water drops, snow, or the like deposited on the window. In a general car, a wiper attached to the window is activated to remove water drops or the like. With this processing, visibility is ensured.

However, in the case of a ship, it needs to eliminate water splash from the ship, for example. Under heavy rain or heavy snowfall, a wiper motion may insufficiently remove water drops or snow, and it may also cause the condition that the wiper does not bear the weight of snow. There is a "spin window" as a structure for ensuring sufficient visibility under such a condition.

The spin window has a structure that ensures visibility from a transparent disc-shaped window by spinning the disc-shaped window at a high speed and scattering water drops or snow deposited on the window therearound.

By providing the operator's seat with the spin window, it becomes possible to efficiently remove the water drops or snow deposited on the window of the operator's seat.

By locating the spin window, the operator can check the condition in the travel direction from the disc-shaped window and safety driving is possible.

Note that the spin window is small and is difficult to look because a spin mechanism of a motor is present on the center. For example, as disclosed in Patent Literature 1 (Japanese Patent Application Laid-open No. 2015-093587), it is known in the art that an image is captured by a camera located at a rear side thereof and is displayed on a display monitor.

The spin window in the related art through which an outside environment is directly looked has a general structure that a circle window itself is spinned at a high speed. The circle window is generally small having a diameter of about several tens cm. The operator has to check the outside environment from the small window.

In general, the operator's seat includes devices such as a variety of instruments, a steering handle, and a lever. The devices are located between the window and the operator's seat. Therefore, the operator cannot move his face closer to the spin window and has to look the small spin window from a predetermined distance.

Accordingly, a viewing angle range that can be checked by operator's naked eyes via the spin window is extremely narrow. In particular, visibility in left and right directions cannot be sufficiently ensured and a safety operation will be undesirably difficult. Furthermore, the structure shown in Patent Literature is that a camera is located at a rear surface of a simple transparent disc spinning at a high speed and is exposed to rain in a case space. Rain drops or water drops also enter between the camera and the transparent disc. Once moisture enters the case space and the outside of the spin window is exposed to low temperature, inside moisture condenses on the window at a low temperature, etc. The situation that lowers the visibility arises.

Furthermore, in a case where it tries to ensure the visibility by applying illumination in the dark in the bad weather, illumination light impinges on water drops in the environment and returns back to a light source side by scattering. Thus, there is a problem that, even if illumination is applied in the dark, the visibility in a distance is not effectively provided. In addition, different from visually recognizing the outside environment with compound eyes, viewing with one eye lowers the visibility than viewing with compound eyes because the visibility may be largely interrupted by rain drops or snow.

CITATION LIST

Patent Literature

Patent Literature 1: Japanese Patent Application Laid-open No. 2015-093587

DISCLOSURE OF INVENTION

Technical Problem

The present disclosure is made in view of the above-mentioned circumstances, and it is an object of the present disclosure to an image processing apparatus, an image capturing apparatus, an image processing method, and a program such that it becomes possible to cause an operator to reliably check ambient conditions by capturing an image via a spin window included in various transportation such as a train, a ship, and a vehicle and displaying the captured image on a display located at an operator's seat.

Solution to Problem

A first aspect of the present disclosure is an image processing apparatus, including:
a spin window;
a camera that captures an image via the spin window;
an image processor that inputs the captured image by the camera and generates a display image; and
a display that displays the generated image by the image processor,
the camera being a wide-angle camera.

Furthermore, a second aspect of the present disclosure is an image capturing apparatus, including:

a spin window;

a camera that captures an image via the spin window;

a housing that stores the camera in the spin window; and an outside air entering prevention mechanism of preventing outside air from entering inside the housing where the camera is located, the mechanism being arranged between an outer periphery of the spin window and the housing.

Furthermore, a third aspect of the present disclosure is an image processing method executed by an image processing apparatus, including the steps of:

capturing an image via a spin window by a wide-angle camera;

inputting a captured image of the wide-angle camera and generating a display image by an image processor; and displaying an image generated by the image processor by a display.

Furthermore, a fourth aspect of the present disclosure is a program causing an image processing apparatus to execute image processing including the steps of:

capturing an image via a spin window by a wide-angle camera;

inputting a captured image of the wide-angle camera and generating a display image by an image processor; and displaying an image generated by the image processor by a display.

Note that the program of the present disclosure is a program that can be provided by a storage medium, a communication medium being provided in a computer readable format to an image processing apparatus or a computer system being capable of executing a variety of program codes. By providing such a program in a computer readable format, processing corresponding to the program on an information processing apparatus or a computer system.

Still other objects, features, or advantages of the present disclosure will be apparent from a more detailed description as described later based on embodiments or attached drawings of the present invention. Note that a system is a logical set configuration of a plurality of apparatuses and the apparatuses of the respective configurations are not necessarily within the same housing in the specification.

Advantageous Effects of Invention

According to an embodiment of the present disclosure, an image processing apparatus that displays the camera captured image via the spin window on the display and the condition of the travel direction even in the bad weather can be more reliably checked is realized.

It should be noted that the effects described in the present specification are merely illustrative and are not limitative, and may have an additive effect.

BRIEF DESCRIPTION OF DRAWINGS

FIGS. 4A and 4B are views of describing a configuration example that an captured image by a camera via spin windows is shown to a driver.

5A and 5B are views of describing a configuration example that an captured image by a camera via spin windows is shown to a driver.

Figure 6:
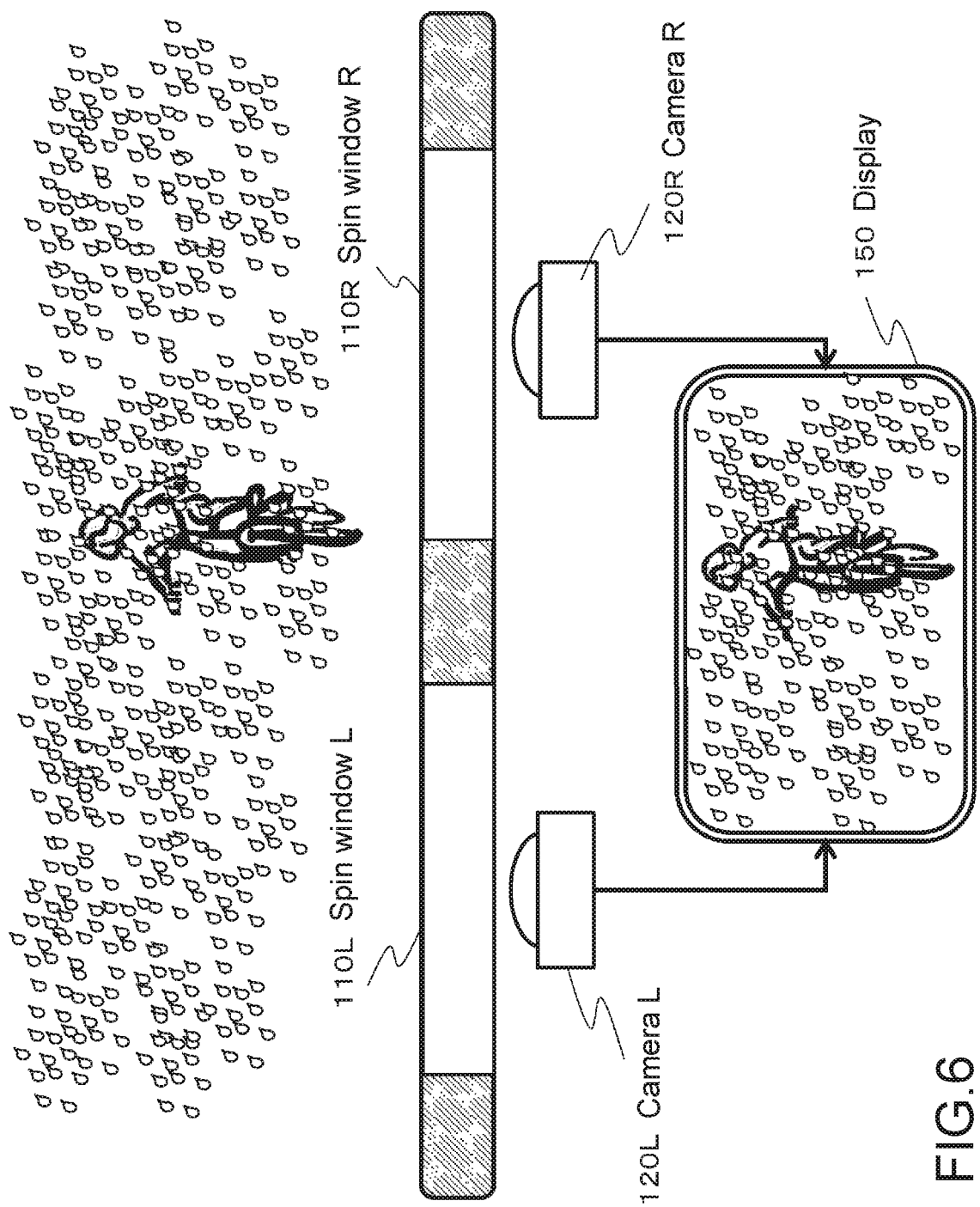

FIG. 6 is a diagram of describing a configuration example that a specific target is clearly displaying on the basis of a camera captured image using pulse light.

Figure 7:
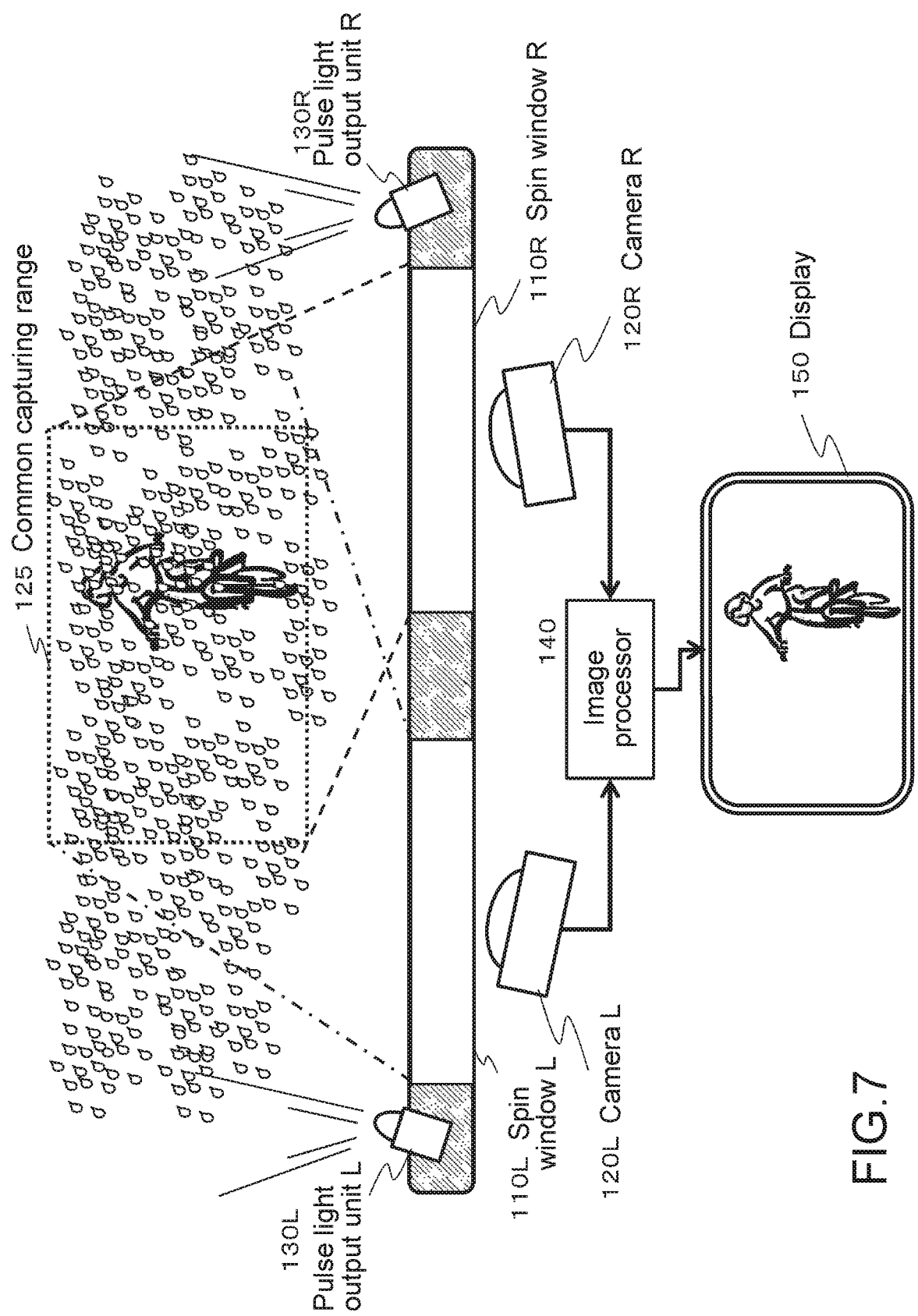

FIG. 7 is a diagram of describing a configuration example that a specific target is clearly displaying on the basis of a camera captured image using pulse light.

Figure 8:
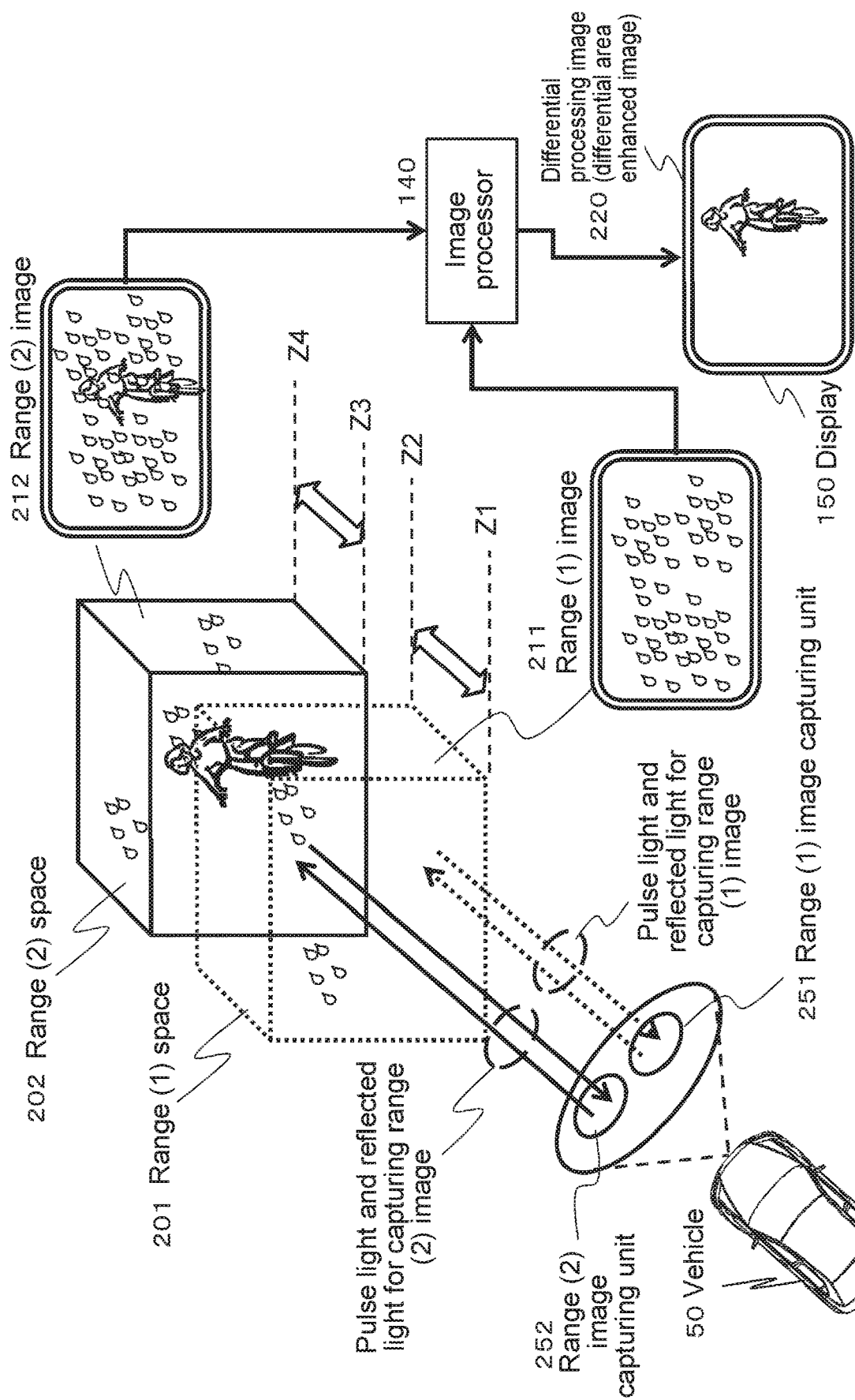

FIG. 8 is a diagram of describing a configuration example that a specific target is clearly displaying on the basis of a camera captured image using pulse light.

Figure 9:
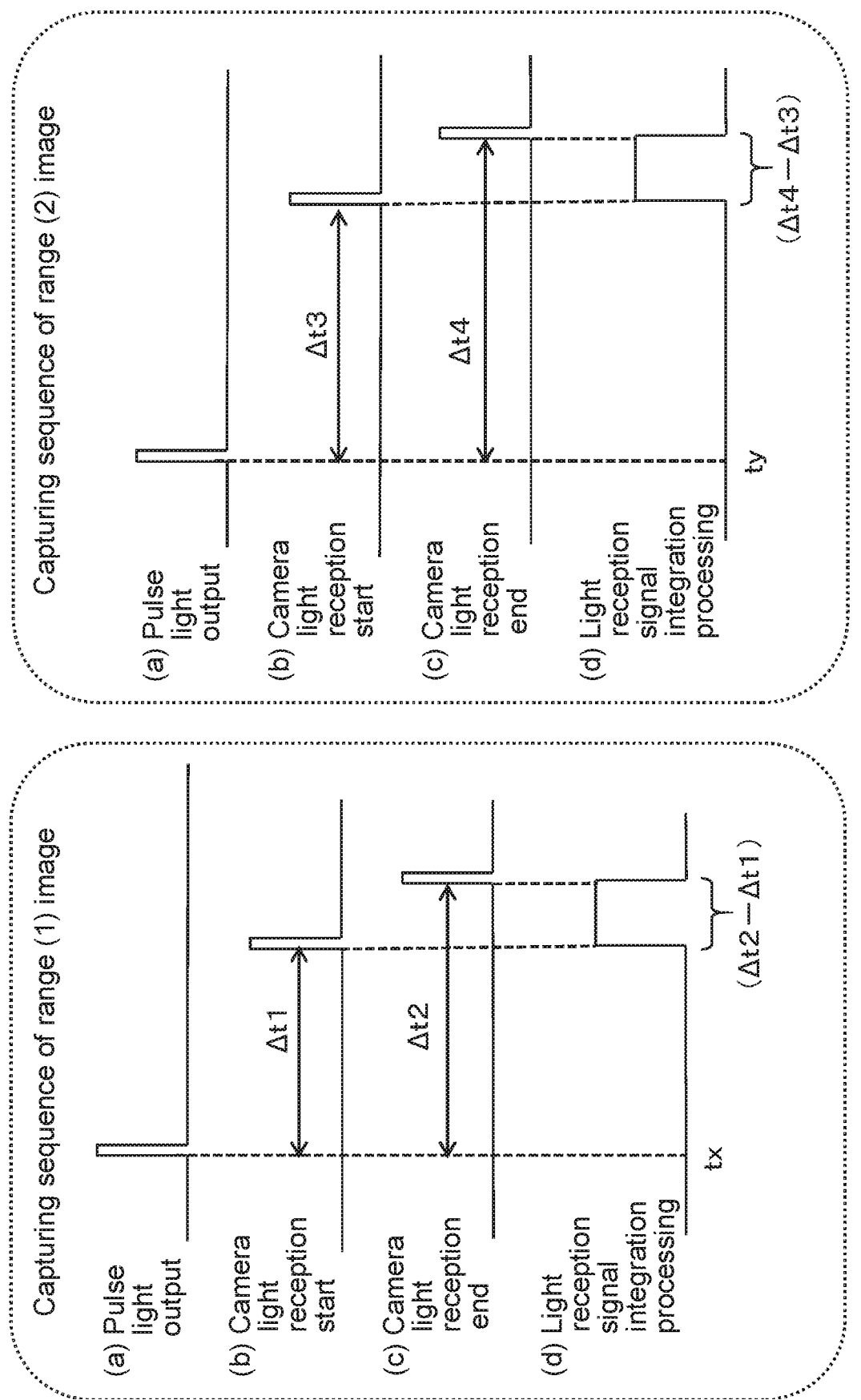

FIGS. 9 are diagrams of describing capturing sequences of processing for clearly displaying a specific target on a basis of a camera captured image using pulse light.

Figure 10:
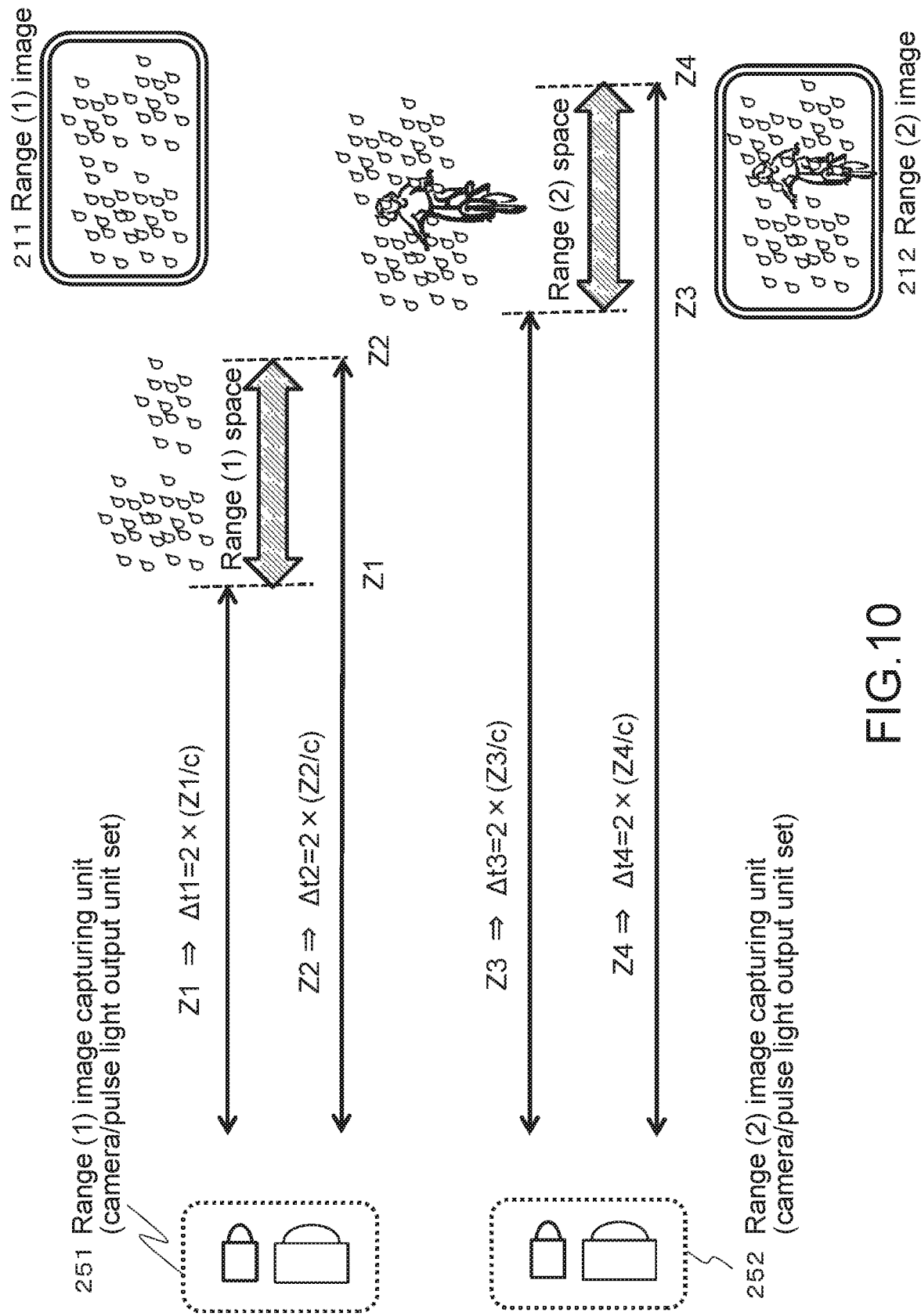

FIG. 10 is a diagram of describing a capturing space of processing for clearly displaying a specific target on a basis of a camera captured image using pulse light.

Figure 11:
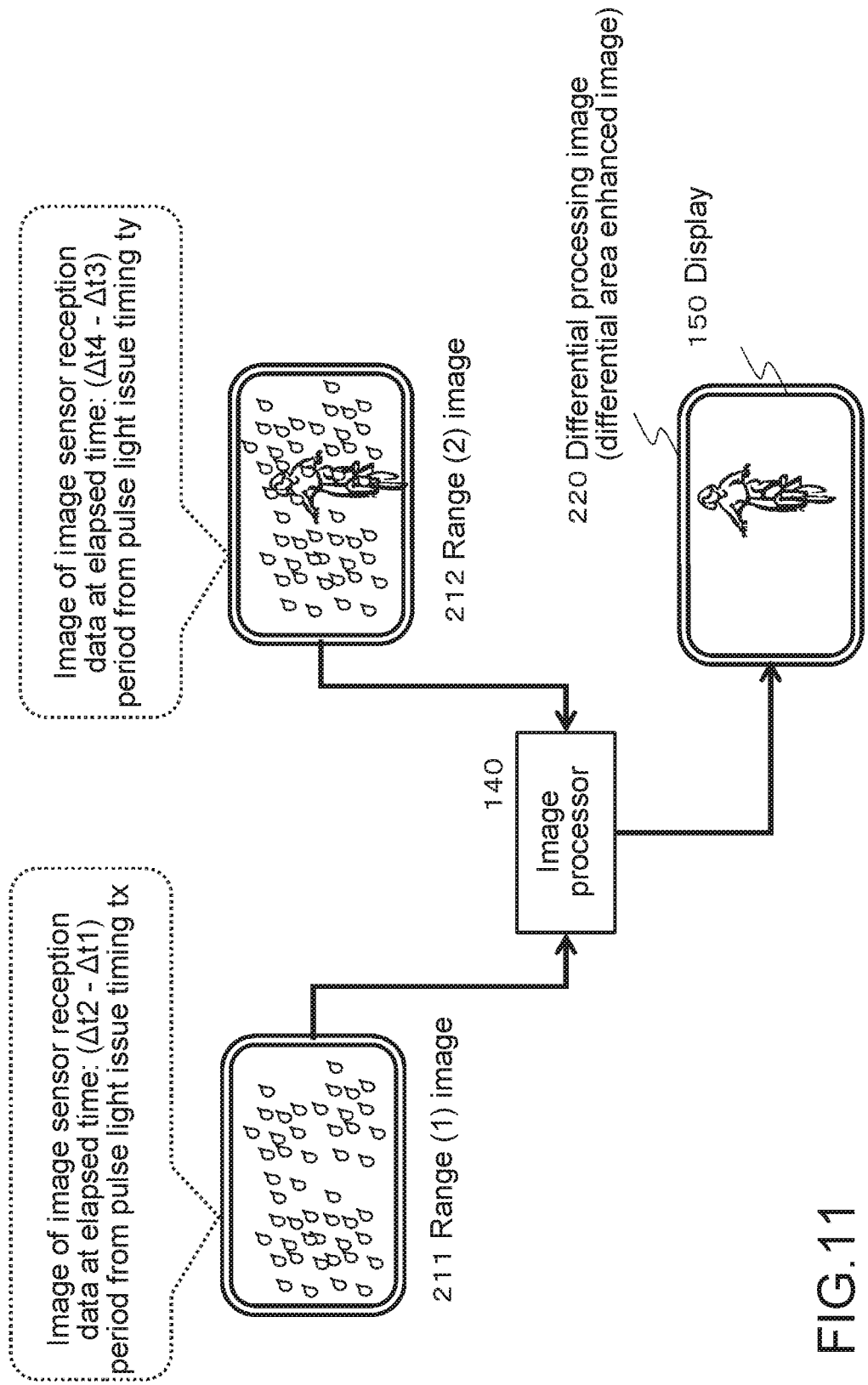

FIG. 11 is a diagram of describing a processing for clearly displaying a specific target on a basis of a camera captured image using pulse light.

Figure 12:
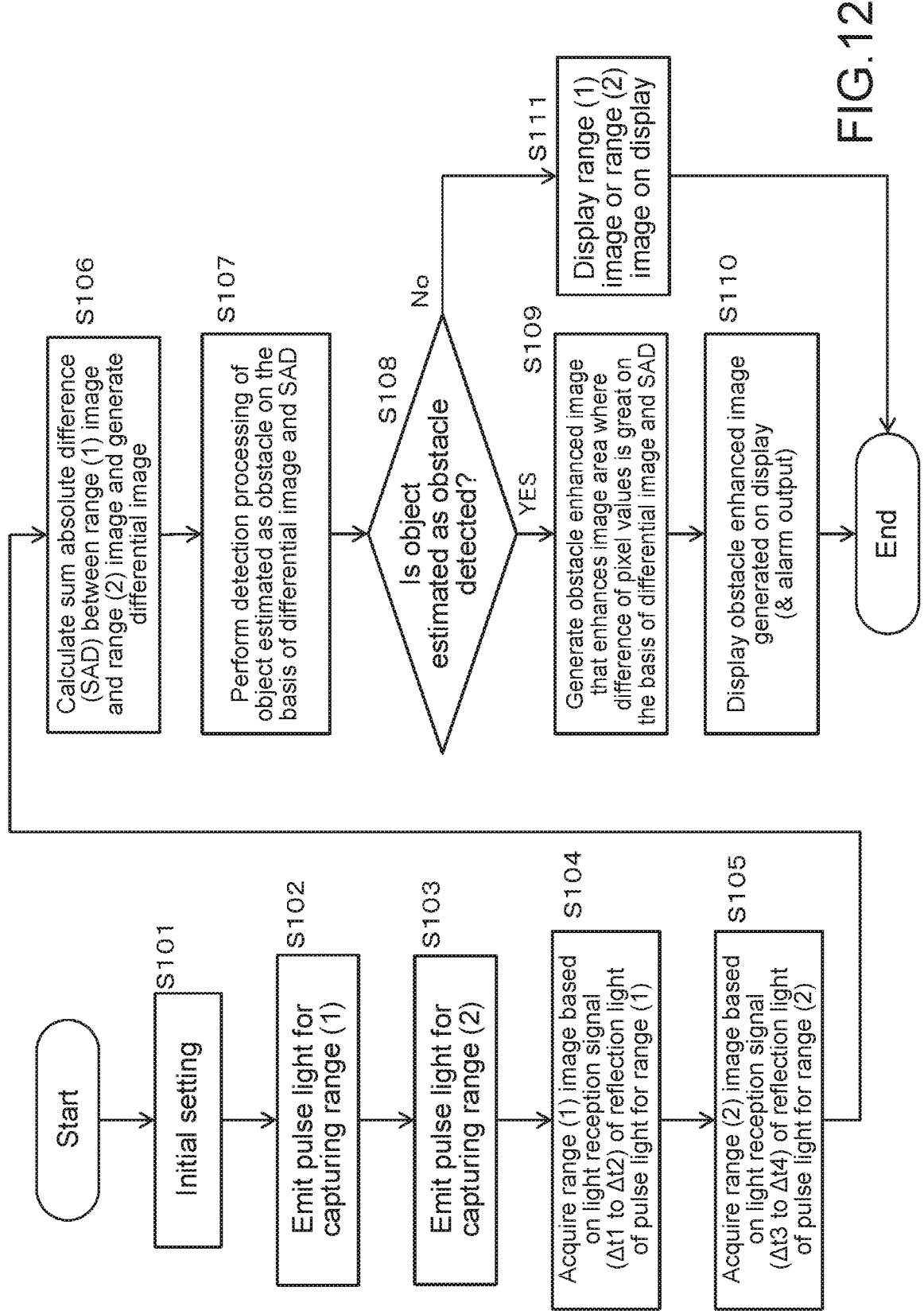

FIG. 12 is a diagram showing a flowchart of describing sequence of processing for clearly displaying a specific target on a basis of a camera captured image using pulse light.

Figure 13:
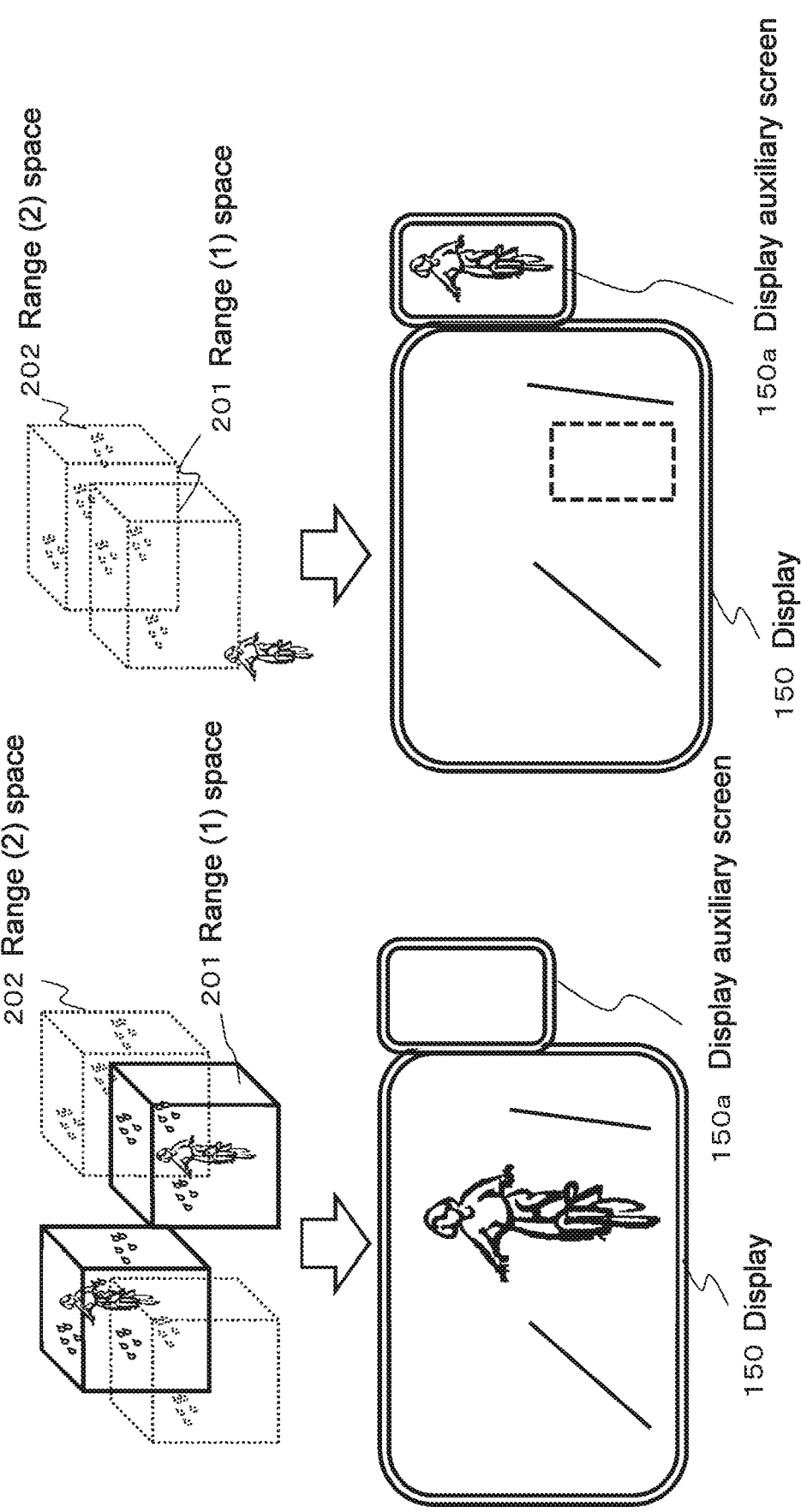

FIGS. 13A and 13B are diagrams of describing display control processing examples of processing for clearly displaying a specific target on a basis of a camera captured image using pulse light.

Figure 14:
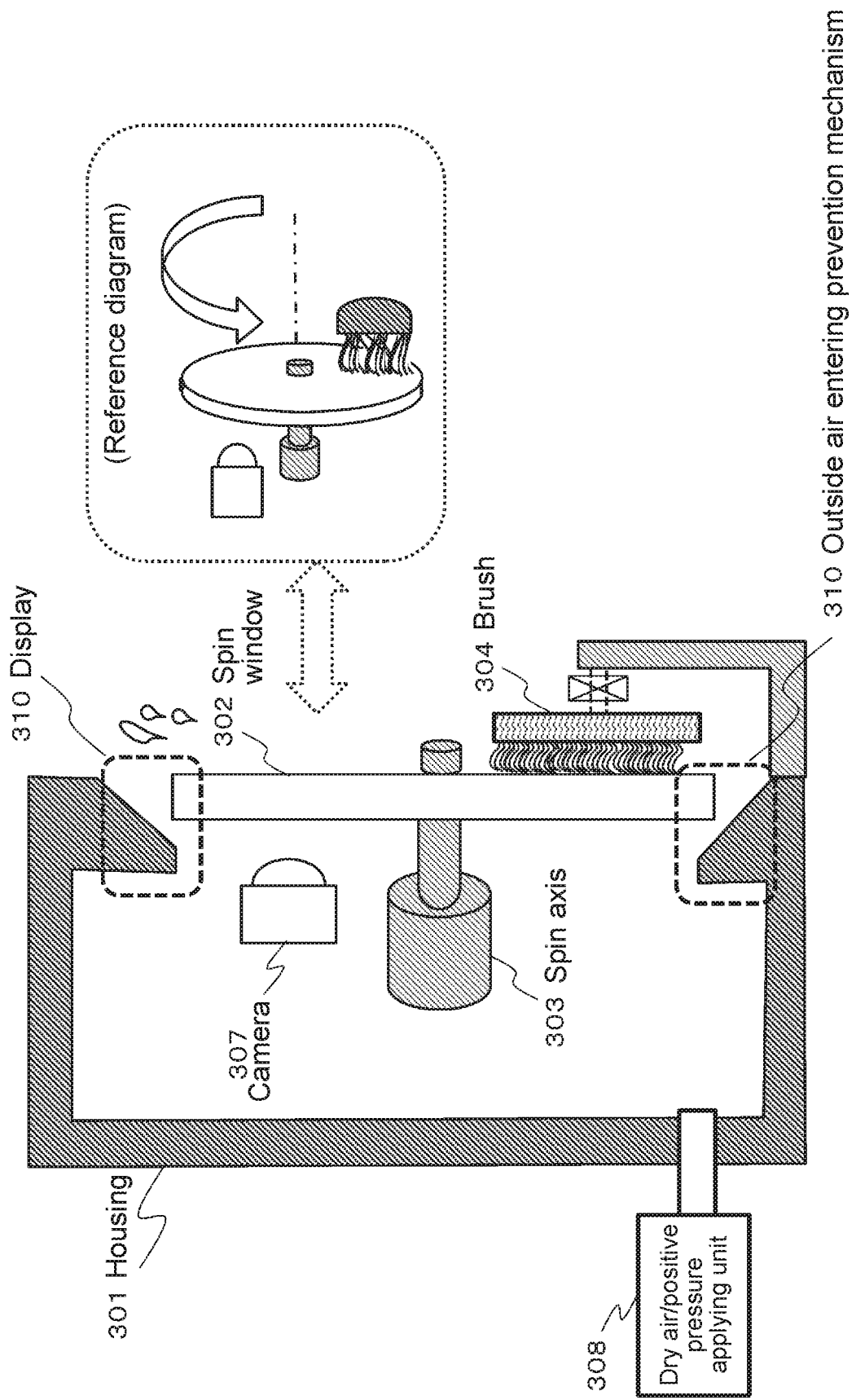

FIG. 14 is a view of describing a configuration example of a spin window.

FIG. 15 is a view of describing a configuration example of a spin window.

FIGS. 16A and 16B are views of describing configuration examples of spin windows.

Figure 17:
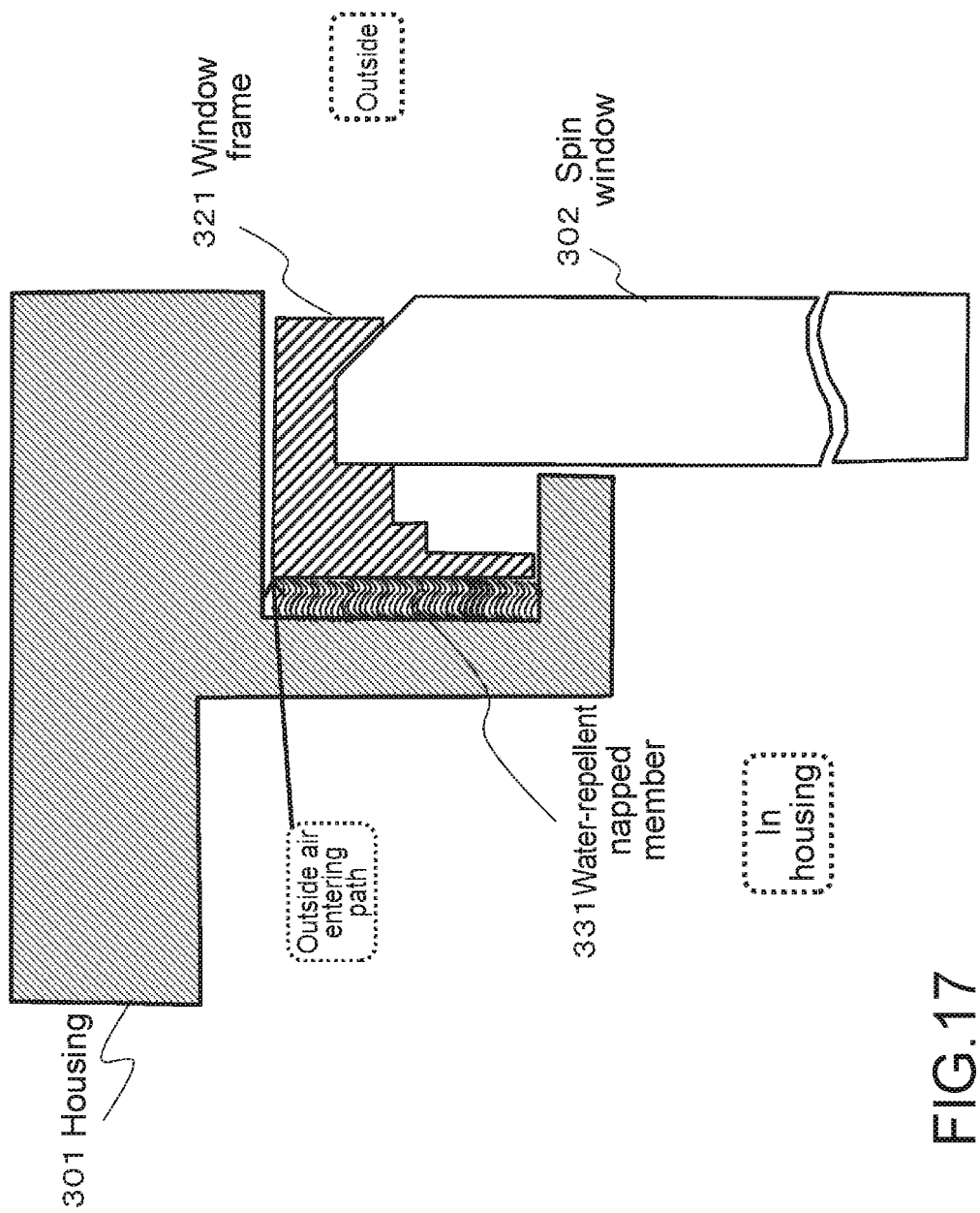

FIG. 17 is a view of describing a configuration example of a spin window.

Figure 18:
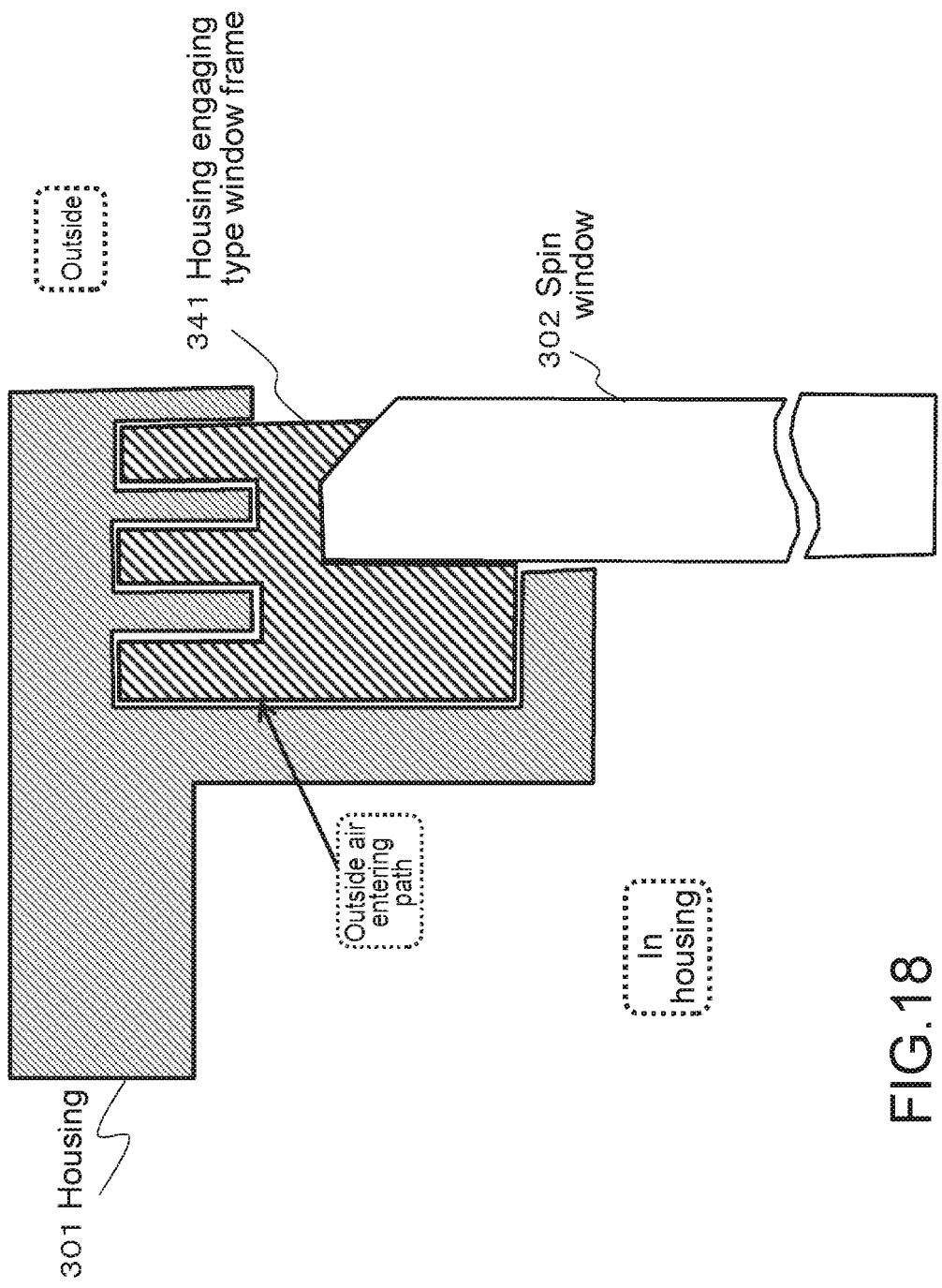

FIG. 18 is a view of describing a configuration example of a spin window.

Figure 19:
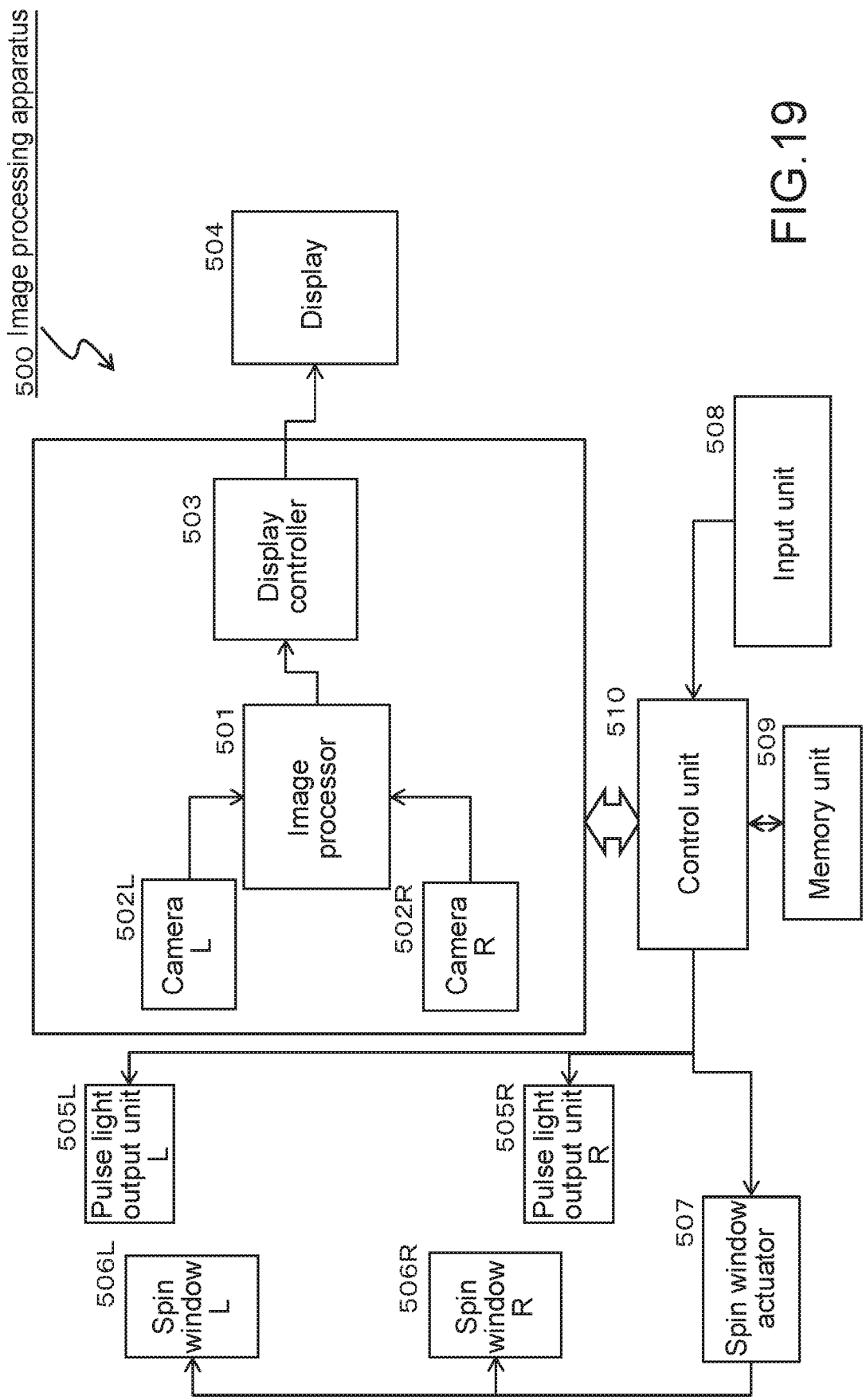

FIG. 19 is a diagram of describing a configuration example of an image processing apparatus.

MODE(S) FOR CARRYING OUT THE INVENTION

Hereinafter, an image processing apparatus, an image capturing apparatus, an image processing method, and a program of the present disclosure will be described with reference to the drawings. Note that the description is done according to the following items.

1. Configuration example of spin window

2. Image capturing from spin windows and display configuration example of captured image 3. Configuration in which clear obstacle image is displayable 4. Modification embodiment of configuration in which clear obstacle image is displayable 4-(1). Configuration example where obstacle detection means is applied 4-(2). Configuration example where auxiliary display is set on display so that obstacle outside range spaces to be captured can be checked 4-(3). Configuration example of camera 5. Configuration example of spin window where camera is arranged inside 5-(1). Configuration example using magnetic fluid 5-(2). Configuration example using water-repellent napped member 5-(3). Configuration example using housing engaging type window frame 6. Configuration example of image processing apparatus
7. Other embodiments
8. Conclusion about configuration of present disclosure

1. Configuration Example of Spin Window

First, with reference to FIG. 1 and later, a configuration example of the spin window will be described.

As described above, an operator who operates various transportation such as a train, a ship, and a vehicle needs to check a travel direction via an operator's seat.

In particular, in the bad weather such as rain and snow, it needs to eliminate water drops and snow deposited on the window. Under such a condition, a "spin window" is used to ensure visibility.

Figure 1:
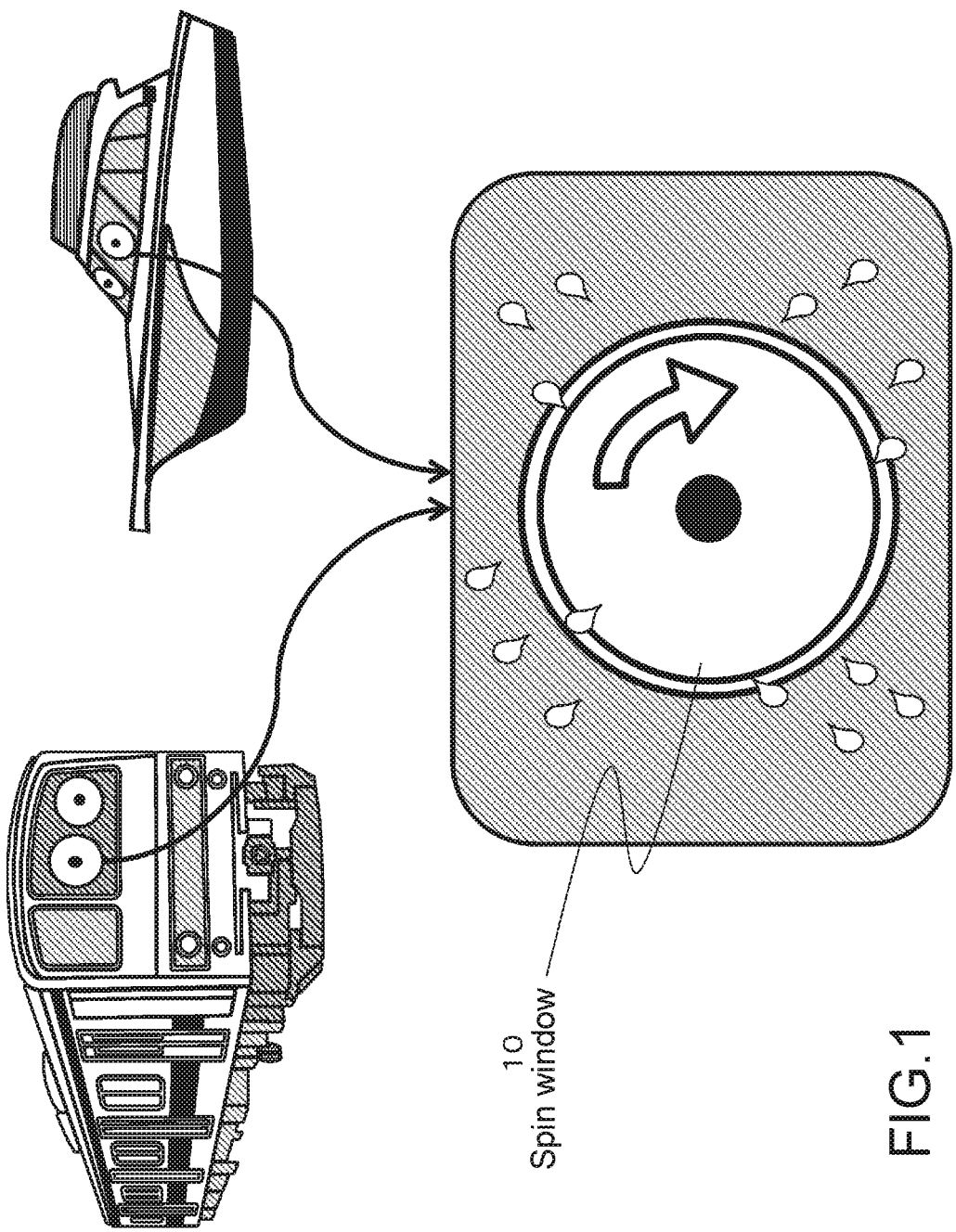
FIG. 1 is a view of describing a spin window.

FIG. 1 shows a spin window 10.

The spin window 10 is widely used in a train, a ship, and the like as shown in FIG. 1.

As shown in FIG. 1, the spin window 10 has a configuration in which a transparent disc-shaped window is spun at a high speed and the water drops and the snow deposited on the window are scattered around the disc, to thereby ensuring the visibility from the disc-shaped window.

By providing the operator's seat with the spin window, it becomes possible to efficiently remove the water drops and the snow deposited on the window of the operator's seat. For example, the operator can check a condition of the travel direction from the disc-shaped window and operate safely.

However, the spin window has a configuration in which a circular window itself is spun at a high speed, and the circular window generally has a diameter of as small as several tens cm. The operator has to check an outside environment.

Figure 2:
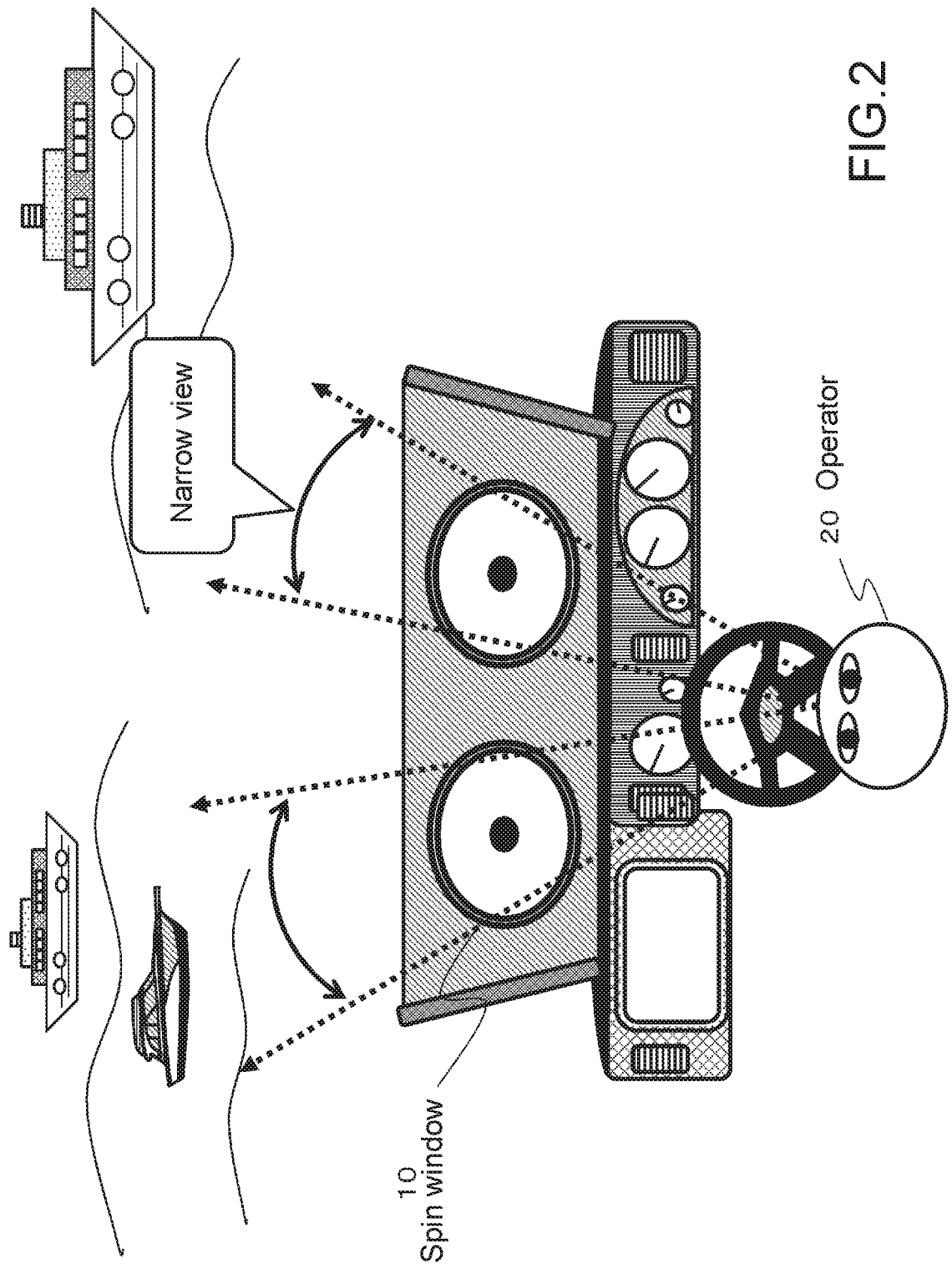
FIG. 2 is a view of describing a spin window.

FIG. 2 shows an example of an operator 20 who checks an ambient condition via the spin windows 10 and operates a ship.

As shown in FIG. 2, an operator's seat generally includes devices such as a variety of instruments, a control handle, a lever, and the like. These devices are located between the window and the operator's seat. Accordingly, the operator 20 cannot move a face closer to the spin windows 10.

In other words, the operator 20 has to look through the small spin windows 10 from the operator's seat apart from the location of the spin windows 10 to a certain extent.

As shown in FIG. 2, visually recognizable ranges by the operator 20 via the spin windows 10 are extremely narrow in the status. In particular, visibility in the left and right directions is not sufficiently ensured and a safety operation will be difficult.

2. Image Capturing from Spin Windows and Display Configuration Example of Captured Image As described above, the operator has to look through the spin windows apart from the location of the spin windows to a certain extent and cannot ensure wide range visibility.

In order to solve the problem, a configuration example will be described. Specifically, cameras located adjacent to the spin windows, e.g., wide-angle cameras having fisheye lenses or the like are located, the outside environment observed from the spin windows is captured by using the cameras, and the captured image is displayed on a display of the operator's seat.

Figure 3:
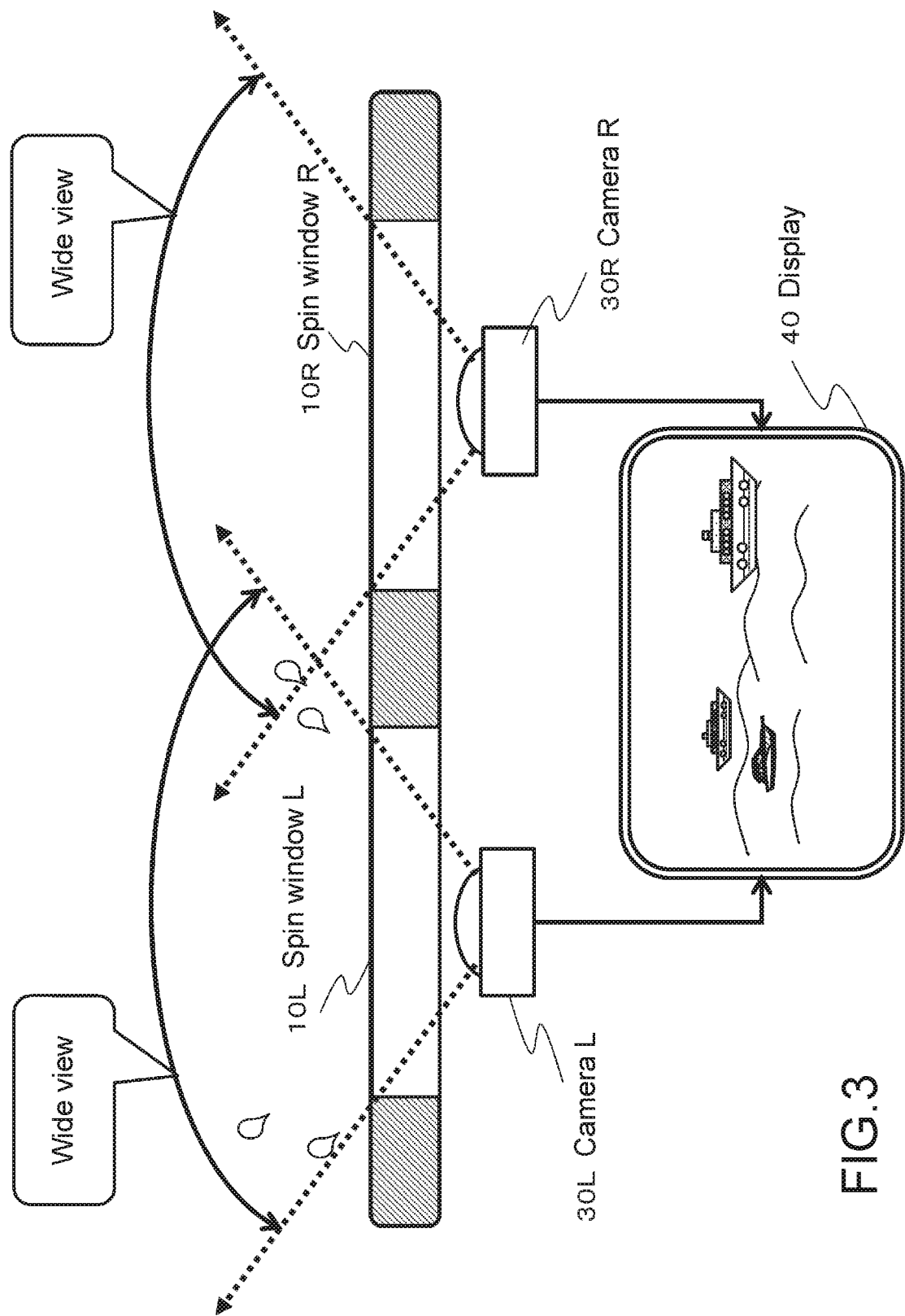
FIG. 3 is a view of describing a configuration example that an captured image by a camera via spin windows is shown to a driver.

FIG. 3 shows a configuration example that cameras are located adjacent to two spin windows and a captured image of the cameras is displayed on a display of the operator's seat.

Note that, in the embodiments described later, a total of two spin windows, one for left and one for right, are arranged, which may be just illustrative. Just one spin window or three or more spin windows may be used.

Each of a spin window L, 10L and a spin window R, 10R corresponds to the spin window shown in FIG. 1.

In other words, the spin window is such that a transparent disc-shaped window is spun at a high speed and water drops and the like deposited on the window are blown off therearound, to thereby ensuring the visibility from the window.

Cameras are provided inside and near the two spin windows (at a vehicle interior side).

Inside the spin window L, 10L at a left side, a camera L, 30L is located. Inside the spin window R, 10R at a right side, a camera R, 30R is located.

Preferably, each camera has a fisheye lens or the like, for example. A wide-angle camera capable of capturing an image in a wider range is preferably used. The reasons are as follows: in a case where an operator checks an outside environment from an optical window and needs to check a necessary direction, visibility in the direction can be acquired by moving eye's positions through the window. However, in a case where a monitor of the image taken via the camera is observed, the direction of viewing the outside environment cannot be changed only by changing the direction of viewing the monitor.

However, example usage uses a display control that a part of the image taken by the wide-angle camera that captures the outside environment is displayed on the monitor, the operator moves the eyes as necessary, and the part of the image taken by the wide-angle camera is simulatedly displayed. Furthermore, dissimilar to an optical spin window having direct visibility, there is no need to locate the camera between the eyes and the outside environment to be viewed at a linear middle position, and the camera may be located at any position as long as the direct visibility is not inhibited.

Note that using the wide-angle camera including the fisheye lens or the like is not essential and a normal camera may be used. In this case, a visually recognizing direction corresponding to the above-described usage may be moved along with mechanical pan-tilt motions by a camera body. Alternatively, a plurality of cameras are located in different directions, images taken by the respective cameras may be displayed in a continuously and seamlessly switching manner corresponding to an input instruction by an operator's view.

The captured images of the two cameras are displayed on a display 40 as a synthesized image by combining the respective captured images.

Note that, though not shown, the captured images of the respective cameras are input to an image processor and are subjected to predetermined correction processing and image synthesis processing at the image processor, and the processed image is displayed on the display 40.

The image processor performs a variety of correction processing including distortion correction processing of eliminating remaining distortions as compared with a central projection generated in the image captured by the fisheye lens, for example, denoise processing, contrast improvement processing of compensating for a decrease in contrast due to raindrops, snow, or fog, or the like, and further performs synthesis processing of joining the two images to generate one synthesized image or the like.

Note that since the two spin windows and the two cameras are used in this embodiment, the synthesized image is generated from the two images. However, it is only illustrative and no image synthesis processing is necessary in a case where only one spin window and one camera are used.

As shown in FIG. 3, the cameras 30L and R are located at an adjacent position to the spin window 10L and R and can thus capture wide range images via the spin windows.

In other words, the wide range images are captured similar to the case that the outside is observed by moving the face closer to the spin windows and are displayed on the display 40.

The operator directly observes the image displayed on the display 40 located in an indoor space. The ambient condition of the ship can be checked in a wider range without moving the body from an any position where the screen of the display 40 can be observed. Thus, a safety operation is possible. Although FIG. 3 shows the respective cameras in the same direction, the directions of optical axes of the camera L and the camera R may be spaced so as to observe a wider range depending on the applications.

Note that FIG. 3 shows the example usage of the spin windows and the cameras in a ship. Such a configuration in which the spin windows and the cameras are used to show wide range outside environment images to the operator is not limited to the ship and is applicable to various transportation such as a train, an air plane, and a vehicle.

FIGS. 4A and 4B are diagrams showing an example that camera mounting spin windows 51 are set on a vehicle 50. The camera mounting spin windows 51 have a configuration in which the spin windows and the cameras described with reference to FIG. 3 are included and a view of an outside environment through the spin windows can be captured by the cameras located adjacent to the spin windows.

FIG. 4A is an appearance view of a vehicle front.

The camera captured images are input to the image processor of the vehicle 50 and are processed by a variety of the correction processing such as the distortion correction processing and the denoise processing in the image processor. Furthermore, two images are joined as one synthesized image, which is displayed on a display 52 inside the vehicle as shown in FIG. 4B.

The display 52 is located at a position observable by a driver in a driver's seat and the driver can successively observe the displayed image on the display 52.

In the shown example, an obstacle (bicycle rider) approaching to the vehicle 50 from the front is shown on the display 52.

The configuration example shown in FIGS. 4A and 4B has a dashboard camera including the camera mounting spin windows 51 located at the front part of the vehicle 50 and capturing and displaying a front situation of the vehicle 50 on the display. The dashboard camera in the related art is often located inside the windshield within a range of the wiper motion so that the front can be captured even in rain. However, since the dashboard camera of the example shown in FIGS. 4A and 4B has the camera mounting spin windows 51, the location of the dashboard camera is not limited to the range of the wiper motion and the dashboard camera can be located at a desirable position. In other words, the dashboard camera can be located at the position inside the windshield within the range of no wiper motion where front visibility of the driver is not interrupted.

Note that the embodiment is applied not only to the dashboard camera but also to a front sensing camera that realizes white line recognition, walker and obstacle recognition, sign recognition, and the like.

The configuration example shown in FIGS. 4A and 4B is that the front situation of the vehicle 50 is captured. For example, an alternative configuration is also possible when the camera mounting spin windows 51 are located at a rear part of the vehicle 50 and a rear situation of the vehicle 50 is captured and displayed on the display. In other words, the spin window is applicable not only to a front visibility check but also to a camera of a camera monitor system used alternative to a rearview mirror of a passenger car or the like, for example.

FIGS. 5A and 5B are diagrams showing an example that the camera mounting spin windows 51 are set on a rear part of the vehicle 50.

FIG. 5A is an appearance view of the rear part of the vehicle.

The view at a rear of the vehicle observed through the spin window is captured by the cameras located inside the spin windows.

The camera captured images are input to the image processor of the vehicle 50 and are processed by a variety of the correction processing such as the distortion correction processing, the denoise processing, and contrast improvement processing that compensates a decrease in contrast due to raindrops, snow, or fog in the image processor. Furthermore, two images are joined as one synthesized image, which is displayed on the display 52 inside the vehicle as shown in FIG. 5B.

The display 52 is located at the position observable by the driver in the driver's seat and the driver can successively observe the displayed image on the display 52.

In the shown example, the displayed image of the display 52 displays an ambient condition of a parking lot when the vehicle is parked from the back. Furthermore, as alternatives to side mirrors, cameras may be attached to side surfaces of a vehicle body for rear viewing. Thus, it may also be applied as a camera monitor system.

Thus, in various transportation such as the ship, the train, and the vehicle, the cameras are located adjacent to the spin windows and capture the images via the spin windows and the captured images are displayed on the display that is visually recognizable by the operator. As a result, the operator can easily check wide range outside environment conditions via the spin windows and a safety operation is possible.

3. Configuration in which Clear Obstacle Image is Displayable

As described above, by displaying the image captured by the cameras via the spin windows on the display, the operator can easily check the wide range outside environment conditions via the spin windows and a more safety operation is possible.

However, in many cases, the outside environment is checked by using the spin windows under a bad weather condition such as rain and snow. The image captured by the camera may undesirably include rain or snow. It may be difficult to check the obstacle that may collide with the vehicle, even if the captured image is displayed on the display.

In particular, in a case where illumination is used to capture the image, for example, at night, illumination light is reflected by rain or snow and reflection light undesirably enter into the camera. There is a problem that a subject image of the obstacle that may collide with the vehicle, i.e., an intended target to be captured is less visible.

Hereinafter, a configuration example of solving the problem and displaying the image where the obstacle is more easily visible on the display will be described.

FIG. 6 is a view showing a configuration and an example usage of two spin windows (spin window -L, 110L, spin window -R, 110R), two cameras (camera -L, 120L, camera -R, 120R) that capture images via the spin windows, and a display 150 that displays the captured images of the cameras mounted to the vehicle.

The status is that it's heavy rain outside and a bicycle rider runs toward the vehicle in the heavy rain.

The display 150 shown in FIG. 6 shows raindrops and the bicycle. The illumination light at night is reflected by the raindrops and a large amount of the reflection light is displayed at a bicycle front. As a result, the driver of the vehicle may fail to view the bicycle and an accident may occur.

Under such a condition, the image displayed on the display 150 is changed to an image that clearly displays the obstacle (bicycle) by decreasing the raindrops (reflection light caused by raindrops).

A configuration for displaying such an image will be described with reference to FIG. 7 and later.

Similar to the description with referent to FIG. 6, FIG. 7 is a view showing a configuration and an example usage of the two spin windows (spin window -L, 110L, spin window -R, 110R), the two cameras (camera -L, 120L, camera -R, 120R) that capture images via the spin windows, and the display 150 that displays the captured images of the cameras.

To the configuration of FIG. 7, two pulse light output units (pulse light output unit -L, 130L, pulse light output unit -R, 130R) and an image processor 140 are further added and shown.

Note that the two cameras (camera -L, 120L and camera -R, 120R) capture images including an image in a common capturing range 125 shown in FIG. 7 as a capturing range.

However, capturing spaces of the respective cameras may be controlled to set such that the two cameras may capture different spaces.

The control of the capturing spaces are performed by controlling a pulse light emission timing of two pulse light output units (pulse light output unit -L, 130L, pulse light output unit -R, 130R) and a timing of capturing images by the two cameras (camera -L, 120L, camera -R, 120R).

The images in the different spaces captured by the respective two cameras (camera -L, 120L, camera -R, 120R) are input to the image processor 140.

The image processor 140 decreases rain drop images included in the captured images by performing image processing to the two input images, generates an image where only the obstacle (bicycle) is enhanced, and displays the image on the display 150.

A specific processing example will be described with reference to FIG. 8 and later.

FIG. 8 shows the two spaces captured by the respective two cameras (camera -L, 120L, camera -R, 120R), i.e., the following two spaces:

A range (1) space 201, and
a range (2) space 202.

The range (1) space 201 is distant from the vehicle 50 by a range of Z1 to Z2.

On the other hand, the range (2) space 202 is distant from the vehicle 50 by a range of Z3 to Z4.

In the range (1) space 201, no obstacle (bicycle) is present and only rain drops are present.

On the other hand, in the range (2) space 202, the obstacle (bicycle) is present and rain drop are also present.

A cube area shown in FIG. 8 by dotted lines is the range (1) space 201 and the range (1) space 201 is a captured space of an image captured by the range (1) image capturing unit 251.

On the other hand, a cube area shown in FIG. 8 by solid lines is the range (2) space 202 and the range (2) space 202 is a captured space of an image captured by the range (2) image capturing unit 252.

Each of the range (1) image capturing unit 251 and the range (2) image capturing unit 252 includes one camera and one pulse light output unit.

With timing control of the pulse light outputs and image capturing processing of the respective image capturing units 251 and 252, a range (1) image 211 and a range (2) image 212 shown in FIG. 8 are captured individually by the respective image capturing units 251 and 252.

In the range (1) image 211, only a target within the range (1) space 201 is captured. In the example shown in FIG. 8, only rain drops are captured and the range (1) image 211 including the image with only rain drops is captured shown in FIG. 8.

On the other hand, in the range (2) image 212, only a target within the range (2) space 202 is captured. In the example shown in FIG. 8, the obstacle (bicycle) and rain drops are captured and the range (2) image 212 including the image with the bicycle and rain drops shown in FIG. 8.

The range (1) image 211 that captures only the rain drops within the range (1) space 201 and the range (2) image 212 that captures the obstacle (bicycle) and the rain drops within the range (2) space 292 are input to the image processor 140.

In the example shown in FIG. 8, the rain drops and the obstacle are schematically drawn as images having clear contours. However, in the actual captured example, blurred images are seen due to scattering during light flight.

The image processor 140 generates a differential processing image (or differential area enhanced image) 220 between the range (1) image 211 and the range (2) image 212. The differential image itself displayed on the display 150 fulfills a function to attract attention whether or not the obstacle is present even if there is no clear image. For example, areas having the specific differential value or more are enclosed and are monochrome displayed or remain in color. The areas and their peripherals are surrounded in red to attract attention. Using the information, image recognition classification processing may be performed on a human, an automobile, or the like to attract attention corresponding to a subject to be detected. Background information is left and a superimposed image may be displayed in a zebra pattern.

Furthermore, more effectively, in a case where there is an obstacle, attention is attracted to the driver on the screen where the obstacle is present. It needs to effectively provide the driver with the information without relying on automatic detection by image recognition processing. Therefore, weighted contrast enhancement processing corresponding to the differential amount is performed on a differential generated area. This processing attracts the driver's attention by mainly focusing on the information about the area. As a result, the obstacle can be checked more promptly and an appropriate decision can be done.

The enhancement processing is performed on a differential generated area of an actually captured image on the basis of differential information. As an image provided by making the obstacle area obvious, a differential processing image 220 of FIG. 11 is shown. In this image, as the differential amount in the surrounding area excluding the obstacle is comprehensively small, no contrast enhancement is performed on the original image. As the differential amount in the obstacle area is comprehensively great, the contrast enhancement is performed on this area corresponding to the difference. As a result, even if any image noises are generated, a locally more shaded image, i.e., a visually strong-stimulated image area is provided. A visually recognizing action that causes the driver to direct attention to the area can be induced.

The rain drop images are included in both of the two images of the range (1) image 211 and the range (2) image 212. However, the obstacle (bicycle) is included only in the range (2) image 212.

Thus, in a case where the differential image between these two images [(range (2) image)–(range (1) image)] is generated, the differential processing image 220 where the rain drop images included in the two images are eliminated and only the obstacle (bicycle) remains is generated.

Here, as explanatory drawings, schematic contours of the rain drops and the obstacle are drawn. As described above, an accumulation integrated image during a delimited short period during which the reflection light is returned in actual rain or fog is captured as sets of high bright spots. The contour of the obstacle within a target section is not explicitly captured. The obstacle having a blurred boundary appears in the shaded image area. Accordingly, by locally performing shade enhancement processing on the original image having the difference, it becomes possible to generate an image that displays the area including the obstacle more clearly. In other words, the differential information can be regarded as a map for performing the local shade enhancement on the screen.

Under the condition having no map for performing local image enhancement in the related art, in order to improve the visibility of the image having a decreased contrast due to heavy rain, accumulated snow, or fog, it is known that a contrast of a whole screen is enhanced by performing, for example, histogram smoothing processing on the whole screen. In this case, shades are enhanced over a whole image, edges of the shades are obvious in the whole image including the rain drops, and the edges are enhanced over the whole screen. The visual performance of the driver results in a lapse of attention. On the other hand, according to the above-described method of the present invention, the contrast enhancement is performed locally at the differential area having a high probability that the obstacle is present. Thus, the driver's attention is mainly attracted to a presence point and it becomes possible to earlier recognize the condition.

This utilizes a performance of visual recognition, i.e., visual nerves of human eyes that are stimulated at the point of change in brightness, i.e., the edges of the shades in a contrast image.

In this manner, by displaying the differential processing image 220 processed by the differential information on the display 150, it may cause a vehicle driver to reliably recognize that the obstacle (bicycle) comes closer to the travel direction.

Note that when the outside environment is irradiated with light and is directly observed with eyes under the environment including reflection matters such as rain, fog, and snow, the reflection light from the obstacle to be observed is reflected on inhibited matters such as rain drops and snow and it becomes difficult to clearly identify the obstacle to be observed. In particular, since the water drops of rain have sphere shapes, this tendency becomes great due to a scattering performance to entered light. In addition, with respect to micro-scale mist water drops under specific conditions, a light splash called the Brocken spectre occurs.

According to the configuration of the present disclosure, in order to solve the problems, the driver is provided with not direct visible images directly observed by eyes but indirect visible images by using the images captured by a camera.

Furthermore, by light emission processing of pulse light to an observation target, the image capturing processing corresponding to the light emission timing, and generation of a differential processing image, a clear image of the target can be shown to the driver.

With reference to FIG. 9 and FIG. 10, the image capturing processing of the range (1) image capturing unit 251 that captures the range (1) image 211 and the range (2) image capturing unit 252 that captures the range (2) image 212 will be described in detail.

FIG. 9 are diagrams of describing a capturing sequence of the range (1) image capturing unit 251 that captures the range (1) image 211 and a capturing sequence of the range (2) image capturing unit 252 that captures the range (2) image 212.

In each sequence diagram, the following four timings are shown in the order:

(a) pulse light output,
(b) camera light reception start,
(c) camera light reception end, and
(d) light reception signal integration processing.

Any of the range (1) image capturing unit 251 and the range (2) image capturing unit 252 includes one camera and one pulse light output unit.

In each sequence diagram shown in FIG. 9, the (a) pulse light output shows a pulse light output timing of the pulse light output unit of each image capturing unit.

The (b) camera light reception start, the (c) camera light reception end, and the (d) light reception signal integration processing show a light reception start timing and an end timing of a camera of each image capturing unit, and an integration processing timing of accumulated charges of the image sensor of the camera.

By the (d) light reception signal integration processing, the range (1) image 211 or the range (2) image 212 are provided.

The range (1) image capturing unit 251 that captures the range (1) image 211 performs the following processing:

(a) pulse light output at time tx,
(b) camera light reception start after $\Delta t1$ elapsed from time tx,
(c) camera light reception end after $\Delta t2$ elapsed from time tx, and
(d) light reception signal integration processing of camera between $\Delta t1$ and $\Delta t2$ from time tx.

As a result of the (d) light reception signal integration processing, the range (1) image 211 that captures only the target within the range (1) space 201 shown in FIG. 8, i.e., only rain drops, is provided.

On the other hand, the range (1) image capturing unit 252 that captures the range (2) image 212 performs the following processing:

(a) pulse light output at time ty,
(b) camera light reception start after $\Delta t3$ from time ty,
(c) camera light reception end after $\Delta t4$ from time ty, and
(d) light reception signal integration processing of camera between $\Delta t3$ and $\Delta t4$ after time ty.

As a result of the (d) light reception signal integration processing, the range (2) image 212 that captures only the target within the range (2) space 202 shown in FIG. 8, i.e., the obstacle (bicycle) and the rain drops, is provided.

A reason why the object of only a reflection image included in each range space is captured by each sequence shown in FIG. 9 will be described with reference to FIG. 10.

FIG. 10 is a diagram of describing a spatial location of the range (1) space where the range (1) image capturing unit 251 captures the range (1) image 211 and the range (2) space where the range (2) image capturing unit 252 captures the range (2) image.

As shown in FIG. 10, each of the range (1) image capturing unit 251 and the range (2) image capturing unit 252 includes one camera and one pulse light output unit.

The timing control of the pulse light outputs and the image capturing processing of the respective image capturing units 251 and 252 is performed in accordance with sequence control described with reference to FIG. 9.

By the sequence control, the range (1) image 211 and the range (2) image 212 shown in FIG. 10 are individually captured at the respective image capturing units 251 and 252.

The range (1) space where the range (1) image capturing unit 251 captures the range (1) image 211 is defined as a space of a distance Z1 to Z2 from the location of the camera and the pulse light output unit of the range (1) image capturing unit 251.

A relationship between each of the times $\Delta t1$ and $\Delta t2$ described earlier with reference to FIG. 9 and each of distances Z1 and Z2 follows the following relational expressions:

$$\Delta t1 = 2 \times (Z1/c), \text{ and}$$

$$\Delta t2 = 2 \times (Z2/c).$$

Note that c denotes the speed of light (=speed of pulse light) in the expressions.

The expressions are rewritten as expressions for calculating to and fro distances of the distances Z1 and Z2:

$$2Z1 = c \times \Delta t1$$

$$2Z2 = c \times \Delta t2$$

The 2Z1 is the to and fro distance from the range (1) image capturing unit 251 to a front end of the range (1) space. The to and fro distance 2Z1 corresponds to a distance that the pulse light travels during the time ($\Delta t1$).

As described with reference to FIG. 9, the time ($\Delta t1$) is an elapsed time from the pulse light output time (tx) to the camera light reception start time.

Specifically, the $\Delta t1$ is the time duration where the pulse light output from the pulse light output unit of the range (1) image capturing unit 251 at the time (tx) reaches the front end of the range (1) space, is reflected by the target at the front end of the range (1) space, e.g., rain drops, and is input to the image sensor of the camera of the range (1) image capturing unit 251.

The pulse light output unit of the range (1) image capturing unit 251 outputs the pulse light at the time (tx). The camera of the range (1) image capturing unit 251 starts capturing processing from the time (tx+$\Delta t1$) when the pulse light is reflected on the target of the front end of the range (1) and enters to the camera, i.e., starts accumulated integration of the entered light to the image sensor.

On the other hand, the 2Z2 is the to and fro distance from the range (1) image capturing unit 251 to a rear end of the range (1) space. The to and fro distance 2Z2 corresponds to a distance that the pulse light travels during the time ($\Delta t2$).

The pulse light output unit of the range (1) image capturing unit 251 outputs the pulse light at the time (tx). The camera of the range (1) image capturing unit 251 ends the capturing processing at the time (tx+$\Delta t2$) when the pulse light is reflected on the target of the rear end of the range (1) and enters to the camera, i.e., ends accumulated integration of the entered light to the image sensor.

Thus, the reflection light of the pulse light output from the pulse light output unit of the range (1) image capturing unit 251 is input to the image sensor of the camera of the range (1) image capturing unit 251. The reflection light is only as follows:

Only the reflection light during the period ($\Delta t2-\Delta t1$) is differentiated from that during the other period and is exclusively detected as an accumulated signal by the image sensor from the time (tx+$\Delta t1$) of inputting to the camera by reflecting on the target of the front end of the range (1) space to the time (tx+$\Delta t2$) of inputting to the camera by reflecting on the target of the rear end of the range (1) space.

The light inputting to the camera image sensor at the time ($\Delta t2-\Delta t1$) is the reflection light from the target within the front end and the rear end of the range (1) space.

The (d) light reception signal integration processing in the capturing sequence of the range (1) image shown in FIG. 9 is light integration processing input to the image sensor of the camera during the time ($\Delta t2-\Delta t1$). By this processing, the range (1) image 211 that captures only the target within the range (1) space is acquired.

In this embodiment, the target within the range (1) space is only rain drops and the range (1) image 211 that captures the rain drops is acquired.

On the other hand, the range (2) space where the range (2) image capturing unit 252 captures the range (2) image 212 is defined as a space of a distance Z3 to Z4 from the location of the camera and the pulse light output unit of the range (2) image capturing unit 252.

A relationship between each of the times $\Delta t3$ and $\Delta t4$ described earlier with reference to FIG. 9 and each of distances Z3 and Z4 follows the following relational expressions:

$$\Delta t3 = 2 \times (Z3/c), \text{ and}$$

$$\Delta t4 = 2 \times (Z4/c).$$

Note that c denotes the speed of light (=speed of pulse light) in the expressions.

The expressions are rewritten as expression for calculating a to and fro distance of each of the distances Z3 and Z3:

$$2Z3 = c \times \Delta t3$$

$$2Z4 = c \times \Delta t4$$

The 2Z3 is the to and fro distance from the range (2) image capturing unit 252 to a front end of the range (2) space. The to and fro distance 2Z3 corresponds to a distance that the pulse light travels during the time ($\Delta t3$).

As described with reference to FIG. 9, the time ($\Delta t3$) is an elapsed time from the pulse light output time (ty) to the camera light reception start time.

Specifically, the $\Delta t3$ is the time duration where the pulse light output from the pulse light output unit of the range (2) image capturing unit 252 at the time (ty) reaches the front end of the range (2) space, is reflected by the target at the front end of the range (2) space, e.g., rain drops, and is input to the image sensor of the camera of the range (2) image capturing unit 252.

The pulse light output unit of the range (2) image capturing unit 252 outputs the pulse light at the time (ty). The camera of the range (2) image capturing unit 252 starts capturing processing from the time (ty+Δt3) when the pulse light is reflected on the target of the front end of the range (2) and enters to the camera, i.e., starts to enter light to the image sensor.

On the other hand, the 2Z4 is the to and fro distance from the range (2) image capturing unit 252 to a rear end of the range (2) space. The to and fro distance 2Z4 corresponds to a distance that the pulse light travels during the time (Δt4).

The pulse light output unit of the range (2) image capturing unit 252 outputs the pulse light at the time (ty). The camera of the range (2) image capturing unit 251 ends the capturing processing at the time (ty+Δt2) when the pulse light is reflected on the target of the rear end of the range (2) and enters to the camera, i.e., ends to enter light to the image sensor.

Thus, the reflection light of the pulse light output from the pulse light output unit of the range (2) image capturing unit 252 is input to the image sensor of the camera of the range (2) image capturing unit 252. The reflection light is only as follows:

Only the reflection light during the period (Δt4−Δt3) is differentiated from that during the other period and is exclusively detected as an accumulated signal by the image sensor from the time (ty+Δt3) of inputting to the camera by reflecting on the target of the front end of the range (2) space to the time (ty+Δt3) of inputting to the camera by reflecting on the target of the rear end of the range (2) space.

The light inputting to the camera image sensor at the time (Δt4−Δt3) is the reflection light from the target within the front end and the rear end of the range (2) space.

The (d) light reception signal integration processing in the capturing sequence of the range (2) image shown in FIG. 9 is light integration processing input to the image sensor of the camera during the time (Δt4−Δt3). By this processing, the range (2) image 212 that captures only the target within the range (2) space is acquired.

In this embodiment, the target within the range (2) space is only rain drops and the range (2) image 212 that captures the rain drops and the obstacle (bicycle) is acquired.

There are thus-obtained two images, i.e., the range (1) image 211, and the range (1) image 212.

These images are input to the image processor 140.

Processing of the image processor 140 will be described with reference to FIG. 11.

As shown in FIG. 11, the range (1) image 211 captures only the rain drops that are the target within the range (1) space 201.

On the other hand, the range (2) image 212 captures the obstacle (bicycle) and the rain drops that are the targets within the range (2) space 202.

The range (1) image 211 that captures only the rain drops within the range (1) space 201 and the range (2) image 212 that captures the obstacle (bicycle) and the rain drops within the range (2) space 292 are input to the image processor 140.

The image processor 140 generates the differential processing image (or differential area enhanced image) 220 between the range (1) image 211 and the range (2) image 212.

The rain drop images are included in both of the two images of the range (1) image 211 and the range (2) image 212. However, the obstacle (bicycle) is included only in the range (2) image 212.

Thus, in a case where the differential image between these two images [(range (2) image)−(range (1) image)] is generated, the differential processing image 220 where the rain drop images included in the two images are eliminated and only the obstacle (bicycle) remains is generated.

The image processor 140 displays the differential processing image 220 on the display 150.

Note that the image processor 140 may have a configuration to generate the differential area enhanced image on which the image processing of enhancing and displaying the differential area is performed as described above or to simply display the differential image.

The differential image or the differential area enhanced image in the image processor 140 is displayed on the display 150.

The image of the obstacle (bicycle) is clearly displayed on the display 150 without inhibiting by the rain drops and the driver of the vehicle can reliably recognize that the obstacle (bicycle) comes closer in front.

Next, with reference to the flowchart shown in FIG. 12, the processing according to the present disclosure, i.e., process sequences of the image processing apparatus mounted to a car, ship, train, or the like will be described.

The processing according to the flow shown in FIG. 12 is performed in accordance with a program stored in a memory unit inside the image processing apparatus mounted to a car, ship, train, or the like under control of a control unit (data processing unit) having a program execution function.

Hereinafter, the processing of each step of the flow shown in FIG. 12 will be sequentially described.

(Step S101)

First, initial setting is done in Step S101. Specifically, it executes to adjust a capturing direction of the camera or a direction of the pulse light output of the pulse light output unit, to perform spinning starting processing of the spin window, or the like.

Furthermore, the two different captured spaces described earlier with reference to FIG. 8 to FIG. 11, i.e., the range (1) space and the range (2) space are defined, and parameters applied for capturing the respective range spaces are determined.

Note that the actual necessity of spinning the spin window, a cleaning operation before and during the use of the spin window, a synchronous use of light from outside, or the like is not inevitably determined and may be determined depending on the conditions and the like during the driving.

For example, the motion of the spin window may be controlled depending on environmental conditions of light from outside in the daytime, in the nighttime, or illumination, a rainfall or a snowfall, fog occurrence conditions, a dirty degree of the window, an own vehicle driving speed, and the like. Furthermore, a motion control suitable for detection is different depending on driving conditions or environmental conditions. Thus, parameter setting or action switching is performed corresponding to the driving conditions or a driving environment.

In particular, a visibility improvement effect of a detection distance space varies depending on, for example, a fog density. Depending on the conditions, an optimization setting is done. Specifically, it determines the time parameters: Δt1 to Δt4 that define the camera light reception start and the end timing described earlier with reference to FIG. 9.

(Step S102)

After the initial setting in Step S101 is completed, in Step S102, the pulse light for capturing the range (1) image is emitted.

This processing corresponds to the "(a) pulse light output" processing in the capturing sequence of the range (1) image shown in FIG. 9.

(Step S103)

Next, in Step S103, the pulse light for capturing the range (2) image is emitted.

This processing corresponds to the "(a) pulse light output processing" in the capturing sequence of the range (2) image shown in FIG. 9.

Note that the order of emitting the pulse light in Steps S102 and S103 may be variously set. The pulse light for capturing the range (2) image may be firstly emitted. Alternatively, the pulse light for capturing the range (1) image and the pulse light for capturing the range (2) image may be emitted at the same time. Furthermore, the range (2) image may be taken as an image in a different time range by using a set device for the range (1) image and the same light emitting light source as long as detection timing control is appropriately performed. In this case, next integration starting processing of the range (2) image is necessary by using the same camera after the integration of the range (1) image is ended. Reading processing at a high speed, a temporary hold memory of information about the range (1) image, or the like is necessary.

(Step S104)

Next, capturing processing based on the reflection light of the pulse light for capturing the range (1) image emitted in Step S102 is performed.

Only during the period of the elapsed time ($\Delta t1$ to $\Delta t2$) from the light emission timing (tx) of the pulse light, light (reflection light of pulse light) enters the image sensor of the camera and the image is captured.

By this processing, the range (1) image including the target in the range (1) captured is captured.

(Step S105)

Next, capturing processing based on the reflection light of the pulse light for capturing the range (2) image emitted in Step S103 is performed.

Only during the period of the elapsed time ($\Delta t3$ to $\Delta t4$) from the light emission timing (ty) of the pulse light, light (reflection light of pulse light) enters the image sensor of the camera and the image is captured.

By this processing, the range (2) image including the target in the range (2) captured is captured.

(Step S106)

Processing in next Step S106 and later is performed by the image processor 140 shown in FIG. 7, FIG. 8, and FIG. 11.

First, in Step S106, the image processor 140 calculates a sum absolute difference (SAD) between the range (1) image and the range (2) image for a predetermined pixel area unit of a corresponding area, applies calculated data, and generates the differential image between the range (1) image and the range (2) image.

(Step S107 to S108)

Next, in Step S107, using the sum absolute difference (SAD) and the differential image between the range (1) image and the range (2) image, it determines whether or not the target that is determined as the obstacle is present.

For example, in a case where the pixel area having the differential value greater than a predefined differential value and a threshold value greater than the defined threshold value is present, processing of determining the pixel area where the target of the obstacle is present is performed.

In a case where the pixel area where the target of the obstacle is present is detected (determination in Step S108=Yes), it proceeds to Step S109.

On the other hand, in a case where the pixel area where the target of the obstacle is present is not detected (determination in Step S108=No), it proceeds to Step S111.

(Step S109)

In Step S108, in a case where the pixel area where the target of the obstacle is present is detected (determination in Step S108=Yes), it proceeds to Step S109.

In Step S109, image correction processing that enhances the area that determines the obstacle is present (=area where difference of pixel values is great) is performed by using the sum absolute difference (SAD) between the range (1) image and the range (2) image and the differential image and generates the differential area enhanced image (obstacle enhanced image).

Note that, as the enhancement processing of the differential area, correction processing such as adaptive local tone enhancement processing and contrast enhancement processing is possible.

Note that histogram smoothing processing and a method of increasing a total contrast may also be applicable. However, in a case where the obstacle is present in a distance, it is effective to perform the contrast enhancement on the area in the distance where a change in the reflection light is detected.

In Step S107 to Step S109 of this flowchart, selective image enhancement processing is intended after the obstacle is detected. Even if the obstacle detection is not performed, the tone enhancement processing may be adaptively performed corresponding to local weighting of the absolute difference. Processing of object detection and determination processing corresponding to the detection is not essential and may be omitted function.

(Step S110)

In Step S110, the differential area enhanced image (obstacle enhanced image) generated in Step S109 is output to the display.

Furthermore, it may be configured to output an alarm such as a warning sound.

Note that it may be configured to omit the correction processing such as the differential area enhancement processing in Step S109 and to output the differential image as-is on the display.

(Step S111)

On the other hand, in Step S108, in a case where the pixel area where the target of the obstacle is present is not detected (determination in Step S108=No), it proceeds to Step S111.

In Step S111, the range (1) image or the range (2) image are displayed.

Note that an output image on the display is a new image of the range (1) image or the range (2) image.

The range (1) image and the range (2) image are repeatedly and alternately captured by the two image capturing units 251 and 252 shown in FIG. 10, for example.

The processing after Step 102 of the flow shown in FIG. 12 is repeatedly performed for a set of captured images captured by the two image capturing units 251 and 252.

In the series of processing, only in a case where the obstacle is detected from the two different range images, the differential image or the differential area enhanced image where the obstacle is clearly displayed by the processing in Step S109 to S110 is displayed.

On the other hand, in a case where no obstacle is detected from the two different range images, the latest image is selected and displayed by the processing in Step S111. Specifically, the range (1) image and the range (2) image are alternately displayed.

In a case where the obstacle such as a bicycle appears at the front of the vehicle, for example, by successively and repeatedly performing the series of processing in Step S102 to Step S110/S111 during vehicle driving, it becomes possible to display the image of the obstacle (bicycle) on the display as a clear image where the rain drops are eliminated, to thereby causing the driver of the vehicle to promptly detect the obstacle and to encourage safety driving of the vehicle.

Note that this embodiment illustrates that the two images capturing units are used, which is not limited thereto. It is also possible to use one image capturing unit. For example, one camera may be configured to capture a plurality of images at timings after elapse of different times from an output start of pulse light.

4. Modification Embodiment of Configuration in which Clear Obstacle Image is Displayable Next, a modification embodiment of a configuration in which the above-described clear obstacle image is displayable will be described.

The following modification embodiments will be described.

(1) Configuration example where an obstacle detection means is applied (2) Configuration example where an auxiliary display is set on the display so that the obstacle outside the range spaces to be captured can be checked (3) Configuration example of camera

4-(1). Configuration Example where Obstacle Detection Means is Applied

First, a configuration example where an (1) obstacle detection means is applied will be described.

The above-described processing example describes the two spaces, i.e., the range (1) space and the range (2) space are set at the predefined positions in the capturing range of the two image capturing units 251 and 252 shown in FIG. 10, for example. Specifically, the positions of the spaces are set as follows:

The range (1) space is in a range between the distances Z1 to Z2 from the image capturing unit of the vehicle.

The range (2) space is in a range between the distances Z3 to Z4 from the image capturing unit of the vehicle.

The space setting is illustrative and other various settings are also possible.

Furthermore, it may be configured to detect the position where the obstacle, for example, a bicycle or the like is present by a sensor or the like in advance, set the space including the detected position as the range (2) space, and to set the range (1) space in front of the range (2) space, etc.

For example, it may be configured to use a LIDAR (Light Detection and Ranging) that measures the distance to the target or a TOF (Time of Flight) camera as the camera.

The TOF camera calculates the distance by using the necessary time from irradiation of infrared light to the target to incidence of the reflected infrared light on the camera.

For example, with the configuration of the infrared light camera used, the distances Z3 to Z4 that define the range of the range (2) space so as to include the calculated distance to a human, the range (1) space is set in front of the range (2) space, and the respective range spaces are captured by the two image capturing units.

By performing the processing, it can acquire the image where the obstacle such as a human is reliably captured.

Furthermore, the infrared light image may be captured as follows: two infrared light images of the respective range spaces, i.e., the range (1) space and the range (2) space are captured, the two infrared light images are applied to generate differential infrared light images, and the differential area enhancement processing is performed on the differential infrared light images to generate and display the image on the display.

4-(2). Configuration Example where Auxiliary Display is Set on Display so that Obstacle Outside Range Spaces to be Captured can be Checked Next, a configuration example (2) where an auxiliary display is set on the display so that the obstacle outside the range space to be captured can be checked will be described.

In the earlier described processing example, only when the obstacle (such as bicycle) is present in any of the predefined two range spaces, i.e., for example, the shown range (1) space or the range (2) space, the obstacle is displayed on the differential image.

For example, if the bicycle shown in FIG. 8 approaches the front of the range (1) space 201 and the differential image between the range (1) space and the range (2) space is generated, no bicycle is detected. As a result, the image of the bicycle will not be displayed on the display 150.

If such image displaying processing is performed, the driver may not be aware of the approaching obstacle.

In order to eliminate such risk, it may have a configuration in which the following processing is performed.

In other words, once it confirms that the obstacle (such as bicycle) is present in any of the range (1) space or the range (2) space, even if no obstacle (such as bicycle) is present in any of the range (1) space or the range (2) space thereafter, an identification frame or the like that shows the image of the obstacle or an area where the presence of the obstacle is estimated is displayed on the display 150 for a certain period of time.

Specific examples are shown in FIGS. 13A and 13B.

FIGS. 13A and 13B show display examples of the display 150 in the following cases:

FIG. 13A in a case where the obstacle is present in the captured space, or

FIG. 13B in a case where the obstacle is not present in the captured space.

(a) In a case where the obstacle is present in the captured space, i.e., in a case where the obstacle (such as bicycle) is present in any of the range (1) space or the range (2) space, the differential image or the differential area enhanced image generated in accordance with the above-described processing is displayed on the display 150.

On the other hand, in a case where the obstacle is not present in the captured space, i.e., in a case where the obstacle (such as bicycle) passes through the range (1) space and the range (2) space and no obstacle (such as bicycle) is present in any of the range (1) space and the range (2) space, the obstacle (such as bicycle) disappears from the differential image or the differential area enhanced image generated in accordance with the above-described processing.

In this case, it configures to continuously display the image of the obstacle on a display auxiliary screen 150a next to the display 150 for a certain period of time. Furthermore, the identification frame that shows the area where the presence of the obstacle is estimated is displayed on the display 150.

In this manner, once it confirms that the obstacle (such as bicycle) is present in any of the range (1) space or the range (2) space, even if no obstacle (such as bicycle) is present in any of the range (1) space or the range (2) space thereafter, an identification frame or the like that shows the image of the obstacle or an area where the presence of the obstacle is estimated is displayed on the display 150 for a certain period of time.

By performing display processing, it becomes possible to continuously give the driver a warning of the presence of the obstacle.

Note that it is a preferable configuration in which an alert (alarm) is also continuously output for a certain period of time.

It is most preferable that the position of the identification frame displayed is updated by estimating and calculating an arrangement of a destination of the target on a road that is moved within a screen depending on the driving conditions. Specifically, since the obstacle stood on the road gets closer to the vehicle along the line connecting screen infinity and the obstacle as the vehicle travels forward, a geometry thereof needs to be corrected depending on the distance between the obstacle and the vehicle.

4-(3). Configuration Example of Camera

The above-described embodiments do not refer a specific configuration of the camera. For example, a time slit sliced space exposure camera can be used.

The time slit sliced space exposure camera is a camera that performs reset and integration of exposure in a time direction for a certain period of time. For example, the camera performs reset processing on two dimensionally arranging pixels as an image sensor by controlling a global shutter, start and end processing of accumulating input light signals, and the like at a specified time.

Note that an available camera utilizes a photon counter type such as a SPAD (Single Photon Avalanche Diode) type light reception device as well as a type of accumulating and storing general photoelectric conversion signal charges on a photo diode.

This is a configuration in which the reflection light of the pulse light is received, a delay time of detected and arrived photons of the reflection light is measured by a counter called as a TDC (time to digital converter), and a delay time image that satisfies a specified delay count is acquired, for example.

In addition, the above-described embodiments describe the configuration examples that uses a plurality of cameras to capture images at different timings.

For example, one camera may be configured to capture a plurality of images at timings after elapse of different times from the output start of pulse light.

As described above, the image processing apparatus of the present disclosure includes the camera that captures an image via the spin window, the image processor that inputs the captured image of the camera and generates a display image, and the display that displays the generated image of the image processor. Furthermore, the image processing apparatus includes the pulse light output unit and the camera includes the first camera and the second camera that capture the images at timings after elapse of different times from the pulse light output timing. The respective cameras capture the images in the different spaces and the image processor generates the differential image between the images captured by the respective cameras and displays the differential image on the display. In the differential image, the obstacle present only in either one of the spaces is more clearly displayed.

This configuration realizes the image processing apparatus that displays the camera captured image via the spin window on the display and the condition of the travel direction even in the bad weather can be more reliably checked.

5. Configuration Example of Spin Window where Camera is Arranged Inside

Next, since it needs to capture the outdoor even in rain and to take an image, a configuration example where a capturing camera body is arranged in a housing having a spin window in a protected space will be described.

In the configuration of the present disclosure, it needs to arrange the camera within a holding space having the spin window and to capture the image of the outside environment via the spin window by the camera.

As described above, the spin window is spun at a high speed and water, snow, and the like deposited on outside of the window are blown off therearound, to thereby ensuring the visibility from the window.

A mechanism of spinning the window at a high speed includes arranging a spin axis at the center of a circle window and spinning the circle window around the spin axis as the center.

In order to smoothly spin the spin window, it needs not only to decrease friction between the spin window and a fixed member as small as possible, but also to prevent entering water drops inside the window. If the water drops or moisture enter, the camera is fogged. In particular, if an optical part of the camera is fogged, a clear image may not be captured.

Hereinafter, a configuration in which smooth spinning of the spin window is maintained and entering of outside air into the spin window is prevented will be described.

With reference to FIG. 14, a configuration example of the spin window where the camera is housed inside will be described.

The configuration of the spin window shown in FIG. 14 is that a housing 301 includes a camera 307 inside.

The spin window 302 spins at a high sped around the spin axis 303. In order to remove deposits or the like on an outer face of the spin window 302, a brush 304 that freely rotates around the axis is in contact with the outer surface of the spin window 302. Note that the brush 304 may be fixed.

Note that the brush 304 may be controlled such that the distance between the spin window 302 and the brush 304 is actively changed on the basis of an outer control instruction depending on a spin speed and a dirty degree of the spin window 302.

For example, in a case where the spin speed of the spin window 302 is low, the brush 304 is brought into closely contact with the spin window 302. On the other hand, in a case where the spin speed of the spin window 302 is high, the brush 304 is made slightly apart from the spin window 302 to decrease the close contact. If the brush 304 is freely rotatably mounted to the spin window, the brush 304 receives different rotational forces due to a difference between inner and outer tracks with respect to the spin window and new brush tips can always touch the spin window evenly. Therefore, it becomes possible to keep the spin window clean by spinning the spin window while receiving the rain drops and wiper liquid.

At low speed spinning, the deposits less fly and a removal force of the deposits by the brush 304 have to be increased. At high speed spinning, many deposits fly autonomously and the removal force of the deposits by the brush 304 may be decreased. Although not shown, the brush 304 may be worked together with a spraying mechanism such as a window washer.

Note that, if droplets including, for example, a snow removing agent and window washer liquid are stopped and dried while the brush 304 is in contact with the spin window 302, the snow removing agent and a molten material are crystal-precipitated to stick like water deposits. Under the status, stuck and crystalized precipitates may damage the spin window. Even if a user stops the motion of the spin window, it is desirable that the brush 304 is not stopped immediately and is actuated for a predetermined time, and the motion of the spin window is then stopped. Desirably, the brush 304 may be actively controlled as necessary. For example, the brush 304 automatically detects the condition that the visibility is inhibited due to the dirty spin window or manually comes in contact with the spin window temporarily or only at the time of spinning.

It needs to prevent water drops and moisture from entering from outside by locating the camera 307 in an inner space of the housing 301.

During the motion of the camera and the spinning of the spin window, the status is maintained such that dry air continuously enters from a dry air/positive pressure applying unit 308 to the inside of the housing 301 at a predetermined pressure.

However, it is difficult to entirely come in contact and seal between an outer periphery of the spin window 302 and the housing 301. This is because when the outer periphery of the spin window 302 comes in contact with the housing 301, the smooth spinning of the spin window 302 is inhibited.

Thus, as shown in FIG. 14, it needs to provide any outside air entering prevention mechanism 310 that does not inhibit the spinning of the spin window 302 between the outer periphery of the spin window 302 and the housing 301.

With reference to FIG. 15 and later, a plurality of specific examples of the outside air entering prevention mechanism 310 will be described.

Examples of a plurality of the following outside air entering prevention mechanisms will be sequentially described.

(1) Configuration example using magnetic fluid (2) Configuration example using water-repellent napped member (3) Configuration example using housing engaging type window frame 5-(1). Configuration Example Using Magnetic Fluid First, a configuration example using magnetic fluid will be described.

FIG. 15 is a cross-sectional view showing a configuration of the outside air entering prevention mechanism 310 shown in FIG. 14, i.e., a close contact area between the outer periphery of the spin window 302 and the housing 301 in an enlarged state.

The spin window 302 is fixed to the window frame 321.

In FIG. 15, the spin window 302, the window frame 321, and a metal magnetic ring member 324 are an integral structure fixed to the spin window 302 and are spun at a high speed together with the spin window 302.

The housing 301 is a fixed member and does not spin.

To the housing 301, magnet 322 is fixed. The magnet 322 is ring-shaped magnet 322 being the center spin axis of the spin window 302 as the center.

There is magnetic fluid 323 along lines of magnetic force formed by a magnetic circuit between the ring-shaped magnet 322 connected to the housing and the metal magnetic ring member 324 connected to a spin window frame. The magnetic fluid 323 is attracted to gradient lines of magnetic force of the magnet and gathers locally at a whole outer periphery around magnetic poles of the magnet 322 such that non-melting fat and oil components that is solvent of the magnetic fluid prevents watery components from entering.

The status shown in FIG. 15 is that the spin window 302 is not spun.

When the spin window 302 spins, the shape of the magnetic fluid 323 is changed by stretching toward outside by centrifugal force.

With reference to FIGS. 16A and 16B, modification of the magnetic fluid 323 in the spinning status of the spin window 302 will be described.

FIGS. 16A and 16B show the respective views as follows:

FIG. 16A When spin window stops spin

FIG. 16B) When spin window spins.

(1) When the spin window shows spin, the magnetic fluid 323 is gathered around the magnet 322.

In this status, an outside air entering path into the housing 301 is a clearance between the housing 301 and the window frame 321 as shown.

However, the clearance is sealed with the magnetic fluid 323 and it prevents the outside air from entering into the housing 301.

On the other hand, (2) when the spin window spins at a high speed, the magnetic fluid 323 is diffused around the magnet 322 by the centrifugal force. The magnetic fluid 323 is ejected from a closed magnetic circuit formed by the magnet 322 by the centrifugal force caused by the spinning of the spin window and flows into the outer periphery as shown in FIG. 16B. Around the window frame 321, a flow channel of the magnetic fluid 323, i.e., a receiving reservoir of the magnetic fluid that reserves the magnetic fluid 323 at the time of spinning the spin window 302. Also, in this status, a point of entering the outside air enter, i.e., the clearance between the housing 301 and the window frame 321 is sealed with the magnetic fluid 323 as shown and it prevents the outside air from entering into the housing 301.

Note that there may be a configuration in which the magnetic fluid does not remain in the clearance depending on an injection volume of the magnetic fluid and a shape of the closed magnetic circuit. In this case, a viscous resistance can be avoided and the spin window can be therefore stably spun at low power consumption. If the spinning is stopped, the magnetic fluid that is liquid due to the gradient lines of magnetic force returns to the clearance opened once. If the spinning becomes slow, the magnetic fluid is sealed. In a case where the magnetic fluid is interrupted, the housing may be changed to have a positive pressure so as to prevent the outside air from entering, for example.

5-(2). Configuration Example Using Water-Repellent Napped Member

Next, with reference to FIG. 17, a configuration example where a water-repellent napped member is used will be described.

Also, FIG. 17 is a cross-sectional view showing a configuration of a water drop entering prevention mechanism 310 shown in FIG. 14, i.e., a close contact area between the outer periphery of the spin window 302 and the housing 301 in an enlarged state.

The spin window 302 is fixed to the window frame 321.

In FIG. 17, the spin window 302 and the window frame 321 are an integral structure fixed to the spin window 302 and are spun at a high speed together with the spin window 302.

The housing 301 is a fixed member and does not spin.

In the configuration shown in the FIG. 17, a water-repellent napped member 331 is formed at a contact area between the window frame 321 and the housing 301.

The water-repellent napped member 331 is fixed to the window frame 321 and spins as the spin window 302 spins.

Note that the housing 301 is also subject to water repellent processing at the surface swept by the water-repellent napped member 331 so as to have a configuration in which water drops are difficult to enter into the housing like feather.

With this configuration, a water drop entering path into the housing 301 is a clearance between the housing 301 and the window frame 321 as shown. However, the clearance is sealed with the water-repellent napped member 331 and it prevents the outside moisture from entering into the housing 301 by changing an internal pressure of the housing 301.

5-(3). Configuration Example Using Housing Engaging Type Window Frame

Next, with reference to FIG. 18, a configuration example that a housing engaging type window frame is used will be described.

Also, FIG. 18 is a cross-sectional view showing a configuration of the outside air entering prevention mechanism 310 shown in FIG. 14, i.e., a close contact area between the outer periphery of the spin window 302 and the housing 301 in an enlarged state.

The spin window 302 is fixed to a housing engaging type window frame 341.

In FIG. 18, the spin window 302 and the housing engaging type window frame 341 are an integral structure fixed to the spin window 302 and are spun at a high speed together with the spin window 302.

The housing 301 is a fixed member and does not spin.

In the configuration shown in the FIG. 18, the housing engaging type window frame 341 has a "comb-shaped" engagement structure at a contact area with the housing 301.

With this configuration, the outside air entering path into the housing 301 is a clearance between the housing 301 and the housing engaging type window frame 341 as shown. However, the clearance has the "comb-shaped" engagement structure of the housing engaging type window frame 341 and avoids a linear entering path from outside where water drops less enter.

In addition, surfaces of the "comb-shaped" engagement structure of the housing engaging type window frame 341 and the housing 301 are subject to water repellent processing so as to have a configuration in which water drops are difficult to enter.

This configuration prevents the outside air from entering into the housing 301.

6. Configuration Example of Image Processing Apparatus

Next, with reference to FIG. 19, a configuration example of an image processing apparatus mounted to transportation such as a vehicle, a ship, and a train, will be described.

FIG. 19 is a view showing a configuration example of an image processing apparatus 500 that performs processing according to the above-described embodiments.

As shown in FIG. 19, the image processing apparatus 500 includes an image processor 501, a camera L, 502L, a camera R, 502R, a display controller 503, a display 504, a pulse light output unit L, 505L, a pulse light output unit, 505R, a spin window L, 506L, a spin window R, 506R, a spin window actuator 507, an input unit 508, a memory unit 509, and a control unit 510.

The camera L, 502L captures an image via the spin window L, 506L.

The camera R, 502R captures an image via the spin window R, 506R.

The spin window L, 506L and the spin window R, 506R are spun at a high speed by the spin window actuator 507. By spinning at a high speed, deposits such as rain and snow outside the window are blown off therearound, to thereby ensuring the visibility from the spin window.

The spin windows 506L and R have structures that outside air is difficult to enter the spin windows as described earlier with reference to FIG. 14 to FIG. 18, for example and the cameras 402L and R are arranged inside the spin windows where outside air is difficult to enter.

The pulse light output unit L, 505L and the pulse light output unit R, 505R output pulse light under control of the control unit 510. Specifically, the pulse light output units are used in a case where illumination is used to capture the image, for example, at night.

In addition, the cameras 402L and R also capture the image under control of the control unit 510. In a case where the image is captured in accordance with the output of the pulse light, the capturing processing is started and ended, the image is output, etc. in accordance with the process sequence described earlier with reference to FIG. 9, for example.

The camera L, 502L and the camera R, 502R output the captured images in different range spaces at different distances from the camera location, as described with reference to FIG. 7 to FIG. 12, for example.

The image processor 501 inputs the captured images of the cameras, and generates and outputs an image on the display 504. The generated image is, for example, a synthesized image captured by the camera L, 502L and the camera R, 502R, as described with reference to FIGS. 3, 4A, 4B, 5A, and 5B. The generated synthesized image is displayed on the display 504 via the display controller 503.

However, in a case where illumination is used to capture the image at night, in the bad weather, or the like, the camera L, 502L and the camera R, 502R capture the image under control of the control unit 510 at a predefined timing in accordance with the output of the pulse light from the pulse light output unit L, 505L and pulse light output unit R, 505R as described earlier with reference to FIG. 7 to FIG. 11.

In a case where the image capturing processing using the pulse light is performed, the image processor 501 uses the captured images in different range spaces captured by the camera L, 502L and the camera R, 502R and generates a differential image or a difference enhanced image of the images.

The display controller 503 performs processing of displaying the differential image or the difference enhanced image generated by the image processor 501 on the display 504.

The control unit 510 performs a variety of data processing according to a program stored in the memory unit 509, for example.

Specifically, the control unit 510 performs image capturing timing control by the cameras 502L and R, pulse light output processing control by the pulse light output units 505L and R, actuating control of the spin windows 506L and R, image processing control of the image processor 501, and the like, for example.

The memory unit 509 stores a program, a parameter, and the like in relation to data processing performed by the control unit 510, the image processor 501, the display controller 503, or the like and is used as a work area of each data processing unit. Specifically, the memory unit 509 includes a RAM, a ROM, or the like.

The input unit 508 includes a switch for inputting user's input information, a variety of keys, a touch panel, a gesture sensor, or the like, for example, and can perform processing of moving, enlarging, or the like of the displayed image by the operation of the touch panel integrated with the display 504.

The display controller 503 may perform the display processing of the image according to the input information from the input unit 509. For example, the display controller 503 performs enlarging or reducing the image, changing a display position, or the like according to the input information from the input unit 509.

Note that, other than the configuration shown in FIG. 19, the TOF (Time of Flight) camera that measures the distance to the target, an infrared light camera, infrared light camera, a distance sensor that measures the distance to the target, or the like may be further included.

Furthermore, as described earlier with reference to FIG. 14, the brushes may be attached to outside the spin windows 506L and R.

In addition, the control unit 510 may change the distance between the brushes and the spin windows 506L and R according to the spin speeds of the spin windows 506L and R.

For example, in a case where the spin speeds of the spin windows are low, the brushes are brought into closely contact with the spin windows. On the other hand, in a case where the spin speeds of the spin windows are high, the brushes are made slightly apart from the spin windows to decrease the close contact. At low speed spinning, the deposits less fly and a removal force of the deposits by the brushes have to be increased. At the high speed spinning, many deposits fly and the removal force of the deposits by the brushes may be decreased.

7. Other Embodiments

Next, other embodiments will be described.

(1) Configuration Example Having Protective Hood

The configuration in which the camera is stored inside the spin window can be used as a substitute for a mirror such as a rearview mirror of a current vehicle, for example.

For example, the camera stored in the spin window is located at a current attachment position of the rearview mirror to display the image captured by the camera on a display (monitor) of an operator's seat of the vehicle. It is possible to provide such a camera monitoring system (CMS).

However, with this configuration, it needs to attach the spin window and the camera storing housing to a side of the vehicle and a human or the like may be in contact therewith.

For example, if a human is in contact therewith, a capturing direction may be misaligned or devices may be damaged. In order to prevent such a condition, it is a preferable configuration in which a protective hood or a protective cover covering the spin window and the camera storing housing is arranged such that a direct impact is not applied to the spin window and the camera storing housing.

(2) Spin Control Mechanism of Spin Window

As described above, the spin window is the window spun at a high speed and a motor for spinning the spin window becomes necessary. An outer surface of the spin window faces to the outside environment. If deposits such as mud, for example, are deposited on the spin window, spinning may be inhibited. In this case, a motor load becomes excessive and the motor may be broken. In order to prevent such a condition, it is a preferable configuration in which a protective circuit is arranged at a motor rotation controller to prevent the breakage of the motor due to an overload.

(3) Configuration for Reliable Visibility of Spin Window

As described above, the outer surface of the spin window is in contact with the outside environment and mud or the like may be deposited, etc. Furthermore, it is expected that splash of water due to a melted snow removal agent may be deposited and recrystallized on the surface of the spin window, for example, of a snowplow or the like. In this case, reliable visibility via the spin window may be insufficiently provided.

In order to decrease such a problem, it is a preferable configuration in which the snow removal agent is applied to the spin window, another chemical agent for preventing the snow removal agent from depositing is applied, or a surface treatment is performed.

Furthermore, in order to prevent mud or the like from depositing on the spin window or the clearance between the spin window and the housing, to prevent the snow removal agent from recrystallizing or depositing, or the like, there may be a mechanism that automatically, semi-automatically, or manually sprays a cleaning agent to remove the deposits or remaining liquid drops that may be crystalized.

Also, in order to prevent water drops, sludge, and the like from depositing, a water-repellent coating treatment may be applied to the spin window.

Also, a photoinduced-type hydrophilic coating agent such as $TiO_2$ may be applied.

Such a coating agent may be applied on a regular basis when the spin window is spun or stopped, for example. Thus, the coating agent may be applied using a self-cleaning type control function.

Furthermore, it is also expected that moisture in the spin window or the housing may be frozen when it is used below the freezing point. The frozen clearance expands, etc. and the spin window may be broken.

In order to avoid such a problem, a drain water structure is arranged and a shock-absorbing elastic member for preventing the devices from breaking caused by freezing expansion may be further arranged at a site where moisture is likely to be deposited, for example, at the clearance between the members. Also, a heater for preventing freezing may be included.

Note that the configuration including the heater preferably has a function to acquire information about an ON/OFF status of the heater or self-diagnosis information about abnormality occurrence and a function to display the acquired information on a display that an operator can see and hear.

Furthermore, the spin window is different from a general window, i.e., a viewing window that the operator can directly see outside. The operator does not need to look into the window.

On the other hand, it is also possible to arrange the viewing window that the operator can directly see outside and the spin window in parallel. With such a parallel window arrangement, it needs to arrange the spin window and the camera at the position so as not to interfere the observation of the outside environment from the viewing window by the operator.

For example, the position of the image that captures images is at least 10% outer than an outer periphery of the viewing window in a cabin space. This configuration can reliably provide a wide visibility range via the viewing window.

For example, as the specific position of the camera, it is desirable to arrange upper than a line-of-sight position of an average operator (e.g., position of eyelipse defined by international technical standard ISO4513:1978). In a case where the camera is arranged at the rear, the camera is desirably arranged upper than positions of powering wheels.

8. Conclusion about Configuration of Present Disclosure

As described above, with reference to specific embodiment, the embodiments of the present disclosure have been described in detail. However, it is obvious that those skilled in the art can modify and alter the embodiments without departing from the subject matters of the present disclosure. In other words, the present invention has been disclosed in an illustrative manner and should not be construed as limiting. For understanding of the subject matters of the present disclosure, the scope of claims should be taken into consideration.

Note that the technology disclosed in this specification may have the following structures.

(1) An image processing apparatus, including:
a spin window;
a camera that captures an image via the spin window;
an image processor that inputs the captured image by the camera and generates a display image; and
a display that displays the generated image by the image processor,
the camera being a wide-angle camera.

(2) The image processing apparatus according to (1), in which
the image processor performs distortion correction processing on the captured image of the wide-angle camera to generate the display image.

(3) The image processing apparatus according to (1) or (2), in which
the spin window includes a plurality of spin windows positioned apart,
the camera includes a plurality of cameras located in respective inside areas of the plurality of spin windows, and
the image processor inputs a plurality of captured images by the plurality of cameras, performs synthesis processing of the plurality of input captured images, and generates the display image.

(4) The image processing apparatus according to any of (1) to (2), further including
a pulse light output unit, in which
the camera includes a first camera and a second camera that capture images at timings after elapse of different times from a pulse light output timing of the pulse light output unit,
the first camera and the second camera respectively capture images of different spaces by capturing images at timings after elapse of different times from an output start of the pulse light, and
the image processor generates a differential image between a first image captured by the first camera and a second image captured by the second camera and generates the display image on a basis of the generated differential image.

(5) The image processing apparatus according to (4), in which
the first camera performs image capturing processing in an elapsed time in a range of $\Delta t1$ to $\Delta t2$ from the output start of pulse light to capture a first image that is an image within a first space where output pulse light of the pulse light output unit travels to and fro during a period of time $\Delta t1$ to $\Delta t2$, and
the second camera performs image capturing processing in an elapsed time in a range of $\Delta t3$ to $\Delta t4$ different from the range of $\Delta t1$ to $\Delta t2$ from the output start of pulse light to capture a second image that is an image within a second space where output pulse light of the pulse light output unit travels to and fro during a period of time $\Delta t3$ to $\Delta t4$.

(6) The image processing apparatus according to (4) or (5), in which
the image processor generates a differential area enhanced image that enhances a differential area between the first image captured by the first camera and the second image captured by the second camera, and generates the display image on a basis of the generated differential area enhanced image.

(7) The image processing apparatus according to (6), in which
the image processor performs tone enhancement processing or contrast enhancement processing on an area having a great difference between the first image captured by the first camera and the second image captured by the second camera, and generates the differential area enhanced image.

(8) The image processing apparatus according to any of (4) to (7), in which
the image processor displays an obstacle image on a display auxiliary screen for a predetermined time in a case where an obstacle is detected from the differential image between the first image captured by the first camera and the second image captured by the second camera and is not detected thereafter.

(9) The image processing apparatus according to any of (4) to (8), in which
the camera includes a plurality of infrared light cameras, and
the image processor generates a differential image between first images captured by the plurality of infrared light cameras and the second image captured by the second camera and generates the display image on a basis of the generated differential image.

(10) The image processing apparatus according to (4) to (9), in which
the first camera and the second camera physically form one camera, and
the one camera captures a plurality of images at timings after elapse of different times from the output start of pulse light.

(11) An image capturing apparatus, including:
a spin window;
a camera that captures an image via the spin window;
a housing that stores the camera in the spin window; and
an outside air entering prevention mechanism of preventing outside air from entering inside the housing where the camera is located, the mechanism being arranged between an outer periphery of the spin window and the housing.

(12) The image capturing apparatus according to (11), in which
the camera is a wide-angle camera.

(13) The image capturing apparatus according to (11), in which
the outside air entering prevention mechanism has a configuration in which an outside air entering path between the outer periphery of the spin window and the housing is sealed with a magnetic fluid.

(14) The image capturing apparatus according to (12), in which
the outside air entering prevention mechanism has a mechanism in which a viscous resistance is decreased by changing a sealed amount of a sealing fluid as the magnetic fluid between the spin window and the camera housing depending on a spin speed of the spin window.

(15) The image capturing apparatus according to (11), in which
the outside air entering prevention mechanism has a configuration in which an outside air entering path between the outer periphery of the spin window and the housing is sealed with a water-repellent napped member.

(16) The image capturing apparatus according to (11), in which
the outside air entering prevention mechanism has a configuration in which an outside air entering path between the outer periphery of the spin window and the housing has a comb shape.

(17) The image capturing apparatus according to any of (11) to (15), in which
the camera is located inside the housing at an inner area of the spin window, and the image capturing apparatus further including
at least one of a mechanism of setting a sealed internal pressure inside the housing on which the camera is located as a positive pressure to outside air or a mechanism of introducing dry air into the housing.

(18) An image processing method executed by an image processing apparatus, including the steps of:
capturing an image via a spin window by a wide-angle camera;
inputting a captured image of the wide-angle camera and generating a display image by an image processor; and
displaying an image generated by the image processor by a display.

(19) A program causing an image processing apparatus to execute image processing including the steps of:
capturing an image via a spin window by a wide-angle camera;
inputting a captured image of the wide-angle camera and generating a display image by an image processor; and
displaying an image generated by the image processor by a display.

In addition, a series of processing described in the specification can be performed by using hardware, software, or a structure of combining the both. In a case where the processing is performed by using software, a program in which a process sequence is recorded is installed in a memory of a computer incorporated into dedicated hardware or installed in a general-purpose computer that can perform a variety of processing, to thereby performing the processing. For example, the program can be stored in a recording medium in advance. The program can be installed from the recording medium to the computer. Also, the program can be received via a network such as the LAN (Local Area Network) and the Internet and be installed to the recording medium such as a built-in hard disk.

Note that a variety of processing described in the specification may be performed not only in time series according to the description but also in parallel or individually according to a processing ability of an apparatus performing the processing. In addition, the system in the present invention refers to a logical set structure of a plurality of apparatuses and the apparatuses having the respective structures are not necessarily within the same housing.

INDUSTRIAL APPLICABILITY

As described above, according to the configuration of one embodiment of the present disclosure, it realizes the image processing apparatus that displays the camera captured image via the spin window on the display and the condition of the travel direction even in the bad weather can be more reliably checked.

Specifically, the image processing apparatus includes a camera that captures an image via the spin window, an image processor that generates a display image, and a display that displays the generated image by the image processor. The image processing apparatus further includes a pulse light output unit, and the camera includes a first camera and a second camera that capture images at timings after elapse of different times from a pulse light output timing of the pulse light output unit. The respective cameras capture images of different spaces, and the image processor generates a differential image between the images captured by the respective cameras and displays the differential image on the display. In the differential image, the obstacle present only in either one of the spaces is more clearly displayed.

This configuration realizes the image processing apparatus that displays the camera captured image via the spin window on the display and the condition of the travel direction even in the bad weather can be more reliably checked.

REFERENCE SIGNS LIST 10 spin window
20 operator
30 camera
40 display
50 vehicle
51 camera mounting spin window
52 display
110 spin window
120 camera
130 pulse light output unit
140 image processor
150 display
201 range (1) space
202 range (2) space
211 range (1) image
212 range (2) image
220 differential processing image (differential area enhanced image)
251 range (1) image capturing unit
252 range (2) image capturing unit
301 housing
302 spin window
303 spin axis
304 brush
307 camera
308 dry air/positive pressure applying unit
310 outside air entering prevention mechanism
321 window frame 322 magnet
323 magnetic fluid
324 metal ring member
331 water-repellent napped member
341 housing engaging type window frame
500 image processor
501 image processor
502 camera
503 display controller
504 display
505 pulse light output unit
506 spin window
507 spin window actuator
508 input unit
509 memory unit
510 control unit

The invention claimed is:

1. An image processing apparatus, comprising:
a movable transparent portion;
a camera configured to capture a first image via the movable transparent portion, wherein
the camera is a wide-angle camera, and
a view of the camera through the movable transparent portion is implemented to a vehicle; and
an image processor configured to:
generate a display image based on the captured first image, wherein the generated display image includes a second image of an obstacle and a third image of a plurality of rain drops;
generate a modified display image based on execution of a distortion correction process on the display image, wherein the modified display image includes an enhancement of the first image based on removal of the third image of the plurality of rain drops;
calculate motion of the obstacle on a road displayed in the generated display image;
control a display device to display the generated modified display image including the second image; and
update a position of a mark in the generated modified display image.

2. The image processing apparatus according to claim 1, wherein
a spin window includes a plurality of spin windows positioned apart,
the camera includes a plurality of cameras located in respective inside areas of the plurality of spin windows, and
the image processor is further configured to:
input a plurality of captured images by the plurality of cameras,
perform synthesis processing of the plurality of input captured images, and
generate the display image.

3. The image processing apparatus according to claim 1, further comprising:
a pulse light output unit, wherein
the camera includes a first camera and a second camera that capture images at timings after elapse of different times from a pulse light output timing of the pulse light output unit,
the first camera and the second camera respectively capture images of different spaces by capturing images at timings after elapse of different times from an output start of the pulse light, and
the image processor is further configured to:
generate a differential image between a first image captured by the first camera and a second image captured by the second camera; and
generate the display image on a basis of the generated differential image.

4. The image processing apparatus according to claim 3, wherein
the first camera is further configured to perform image capturing processing in an elapsed time in a range of $\Delta t1$ to $\Delta t2$ from the output start of pulse light to capture a first image that is an image within a first space where output pulse light of the pulse light output unit travels to and fro during a period of time $\Delta t1$ to $\Delta t2$, and
the second camera is further configured to perform image capturing processing in an elapsed time in a range of $\Delta t3$ to $\Delta t4$ different from the range of $\Delta t1$ to $\Delta t2$ from the output start of pulse light to capture a second image that is an image within a second space where output pulse light of the pulse light output unit travels to and fro during a period of time $\Delta t3$ to $\Delta t4$.

5. The image processing apparatus according to claim 3, wherein
the image processor is further configured to:
generate a differential area enhanced image that enhances a differential area between the first image captured by the first camera and the second image captured by the second camera; and
generate the display image on a basis of the generated differential area enhanced image.

6. The image processing apparatus according to claim 5, wherein
the image processor is further configured to:
perform tone enhancement processing or contrast enhancement processing on an area having a great difference between the first image captured by the first camera and the second image captured by the second camera; and
generate the differential area enhanced image.

7. The image processing apparatus according to claim 3, wherein
the image processor is further configured to display an obstacle image on a display auxiliary screen for a predetermined time in a case where an obstacle is detected from the differential image between the first image captured by the first camera and the second image captured by the second camera and is not detected thereafter.

8. The image processing apparatus according to claim 3, wherein
the camera includes a plurality of infrared light cameras, and
the image processor is further configured to:
generate a differential image between first images captured by the plurality of infrared light cameras and the second image captured by the second camera; and
generate the display image on a basis of the generated differential image.

9. The image processing apparatus according to claim 3, wherein
the first camera and the second camera physically form the camera, and the camera is configured to capture a plurality of images at timings after elapse of different times from the output start of pulse light.

10. An image processing method, comprising:
in an image processing apparatus including a camera, an image processor, and a display device:

capturing, by the camera, a first image via a movable transparent portion, wherein
the camera is a wide-angle camera, and
a view of the camera through the movable transparent portion is implemented to a vehicle;
generating, by the image processor, a display image based on the captured first image, wherein the generated display image includes a second image of an obstacle and a third image of a plurality of rain drops;
generating, by the image processor, a modified display image based on execution of a distortion correction process on the display image, wherein the modified display image includes an enhancement of the first image based on removal of the third image of the plurality of rain drops;
calculating, by the image processor, motion of the obstacle on a road displayed in the generated display image;
controlling the display device to display the generated modified display image including the second image; and
updating, by the display device, a position of a mark in the generated modified display image.

11. A non-transitory computer-readable medium having stored thereon computer-readable instructions, which when executed by an image processing apparatus, cause the image processing apparatus to execute operations, the operations comprising:
capturing a first image via a movable transparent portion by a wide-angle camera, wherein a view of the camera through the movable transparent portion is implemented to a vehicle;
generating a display image based on the captured first image, wherein the generated display image includes a second image of an obstacle and a third image of a plurality of rain drops;
generating a modified display image based on execution of a distortion correction process on the display image, wherein the modified display image includes an enhancement of the first image based on removal of the third image of the plurality of rain drops;
calculating motion of the obstacle on a road displayed in the generated display image;
controlling a display device to display the generated modified display image including the second image; and
updating a position of a mark in the generated modified display image.

* * * * *